United States Patent [19]
Ohtake

[11] Patent Number: 6,002,527
[45] Date of Patent: Dec. 14, 1999

[54] COMPACT HIGH-ZOOM-RATIO ZOOM LENS

[75] Inventor: Motoyuki Ohtake, Kawasaki, Japan

[73] Assignee: Nikon Corporation, Tokyo, Japan

[21] Appl. No.: 09/022,242

[22] Filed: Feb. 11, 1998

[51] Int. Cl.$^6$ .............................. G02B 15/14; G02B 3/02; G02B 9/00; G02B 9/60

[52] U.S. Cl. ................ 359/683; 359/684; 359/686; 359/714; 359/715; 359/740; 359/765

[58] Field of Search .................... 359/683, 684, 359/686, 714, 715, 740, 765

[56] References Cited

U.S. PATENT DOCUMENTS

| | | | |
|---|---|---|---|
| 4,789,227 | 12/1988 | Tanaka et al. | 359/684 |
| 4,995,708 | 2/1991 | Sugiura | 359/686 |
| 5,042,927 | 8/1991 | Ogawa et al. | 359/683 |
| 5,185,678 | 2/1993 | Arimoto | 359/683 |
| 5,204,779 | 4/1993 | Nakata et al. | 359/686 |
| 5,241,421 | 8/1993 | Endo et al. | 359/683 |
| 5,442,485 | 8/1995 | Yamanashi | 359/765 |
| 5,530,592 | 6/1996 | Tochigi | 359/684 |
| 5,537,255 | 7/1996 | Tochigi | 359/684 |
| 5,606,459 | 2/1997 | Nakatsuji | 359/683 |
| 5,606,460 | 2/1997 | Ohtake | 359/683 |
| 5,610,766 | 3/1997 | Aoki et al. | 359/683 |
| 5,636,060 | 6/1997 | Suzuki | 359/686 |
| 5,666,229 | 9/1997 | Ohtake | 359/683 |
| 5,666,230 | 9/1997 | Tatsuno | 359/684 |
| 5,717,526 | 2/1998 | Ohtake | 359/683 |
| 5,721,641 | 2/1998 | Aoki | 359/686 |
| 5,737,128 | 4/1998 | Usui | 359/686 |
| 5,760,968 | 6/1998 | Ohtake | 359/683 |

*Primary Examiner*—Georgia Epps
*Assistant Examiner*—Evelyn A. Lester
*Attorney, Agent, or Firm*—Downs Rachlin & Martin PLLC

[57] ABSTRACT

A compact, high-zoom-ratio, high-performance five-group zoom lens having a positive-negative-negative-positive-positive refractive power arrangement. The zoom lens has the ability to focus at close range with minimal movement of the internal lens groups. Each lens group is axially movable, with the second or third lens group available for close-range focusing. The first lens group includes one negative lens element and two positive lens elements. The second lens group includes two negative lens elements and one positive lens element. The third lens group includes one negative lens element and one positive lens element. The fourth lens group includes two positive lens elements and one negative lens element. And, the fifth lens group includes three positive lens elements and two negative lens elements. An aperture stop is disposed imagewise of the third lens group and objectwise of the fifth lens group. The zoom lens preferably satisfies at least one of a number of design conditions.

12 Claims, 19 Drawing Sheets

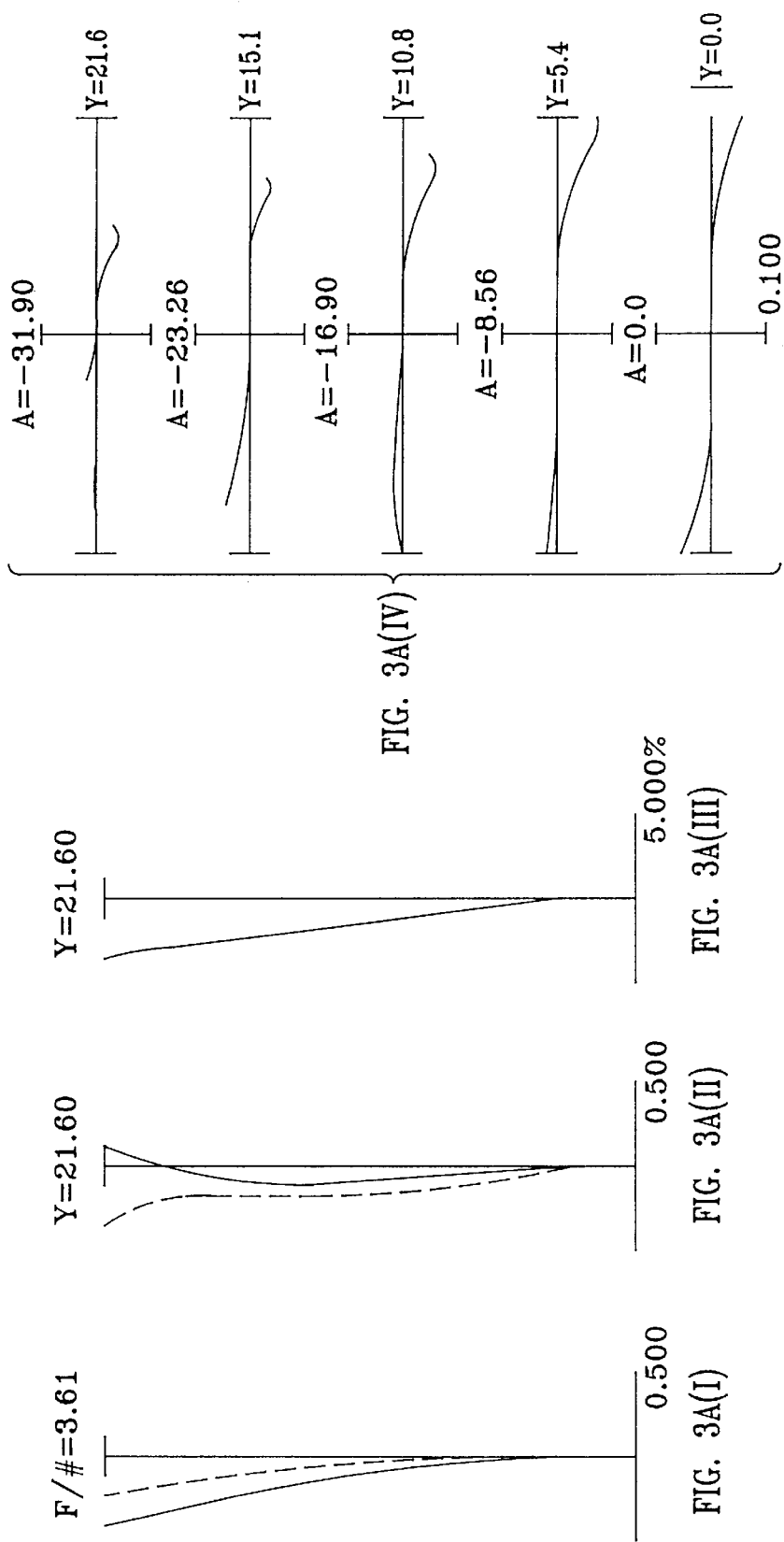

FIG. 3B(IV)

FIG. 3B(III)

FIG. 3B(II)

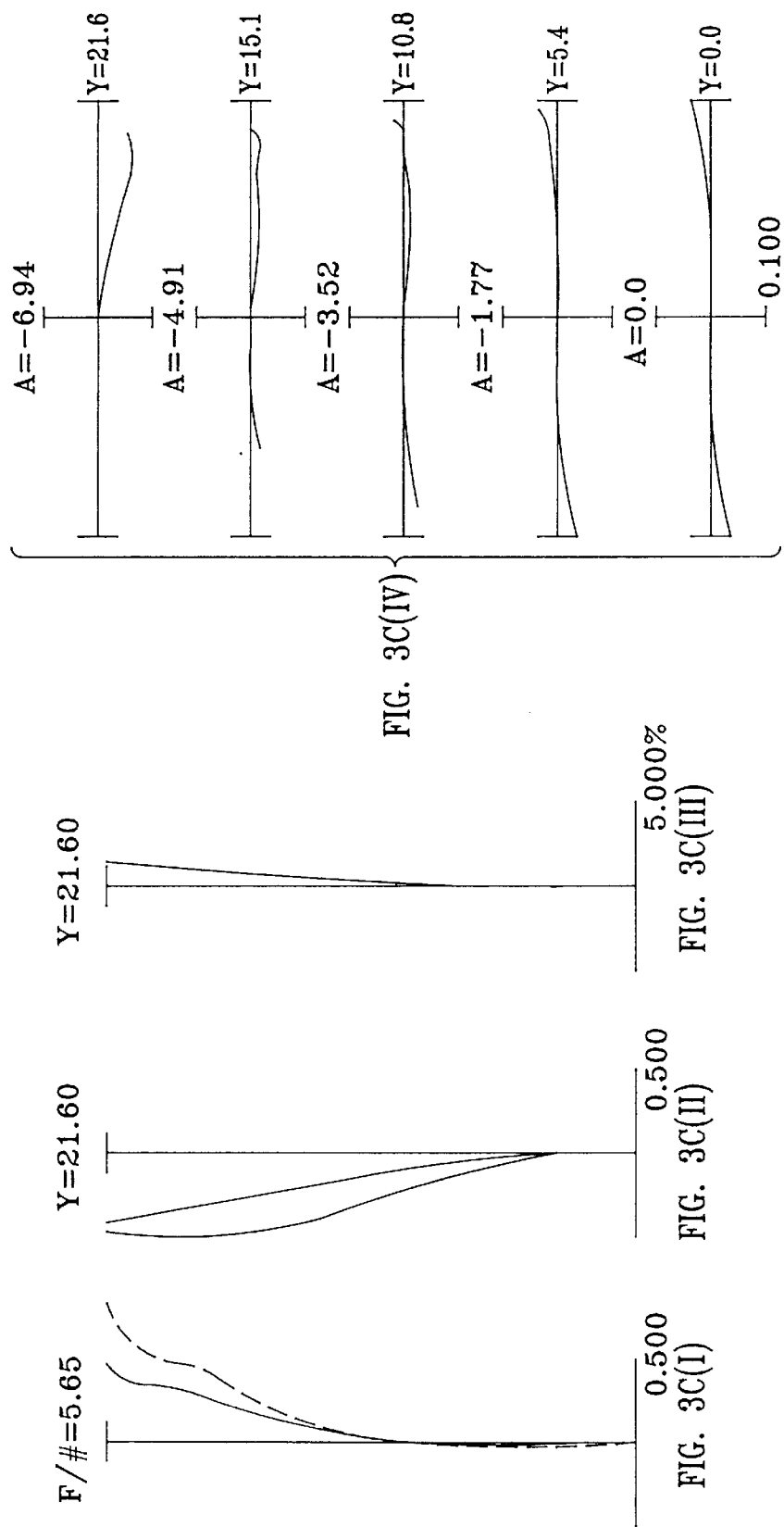

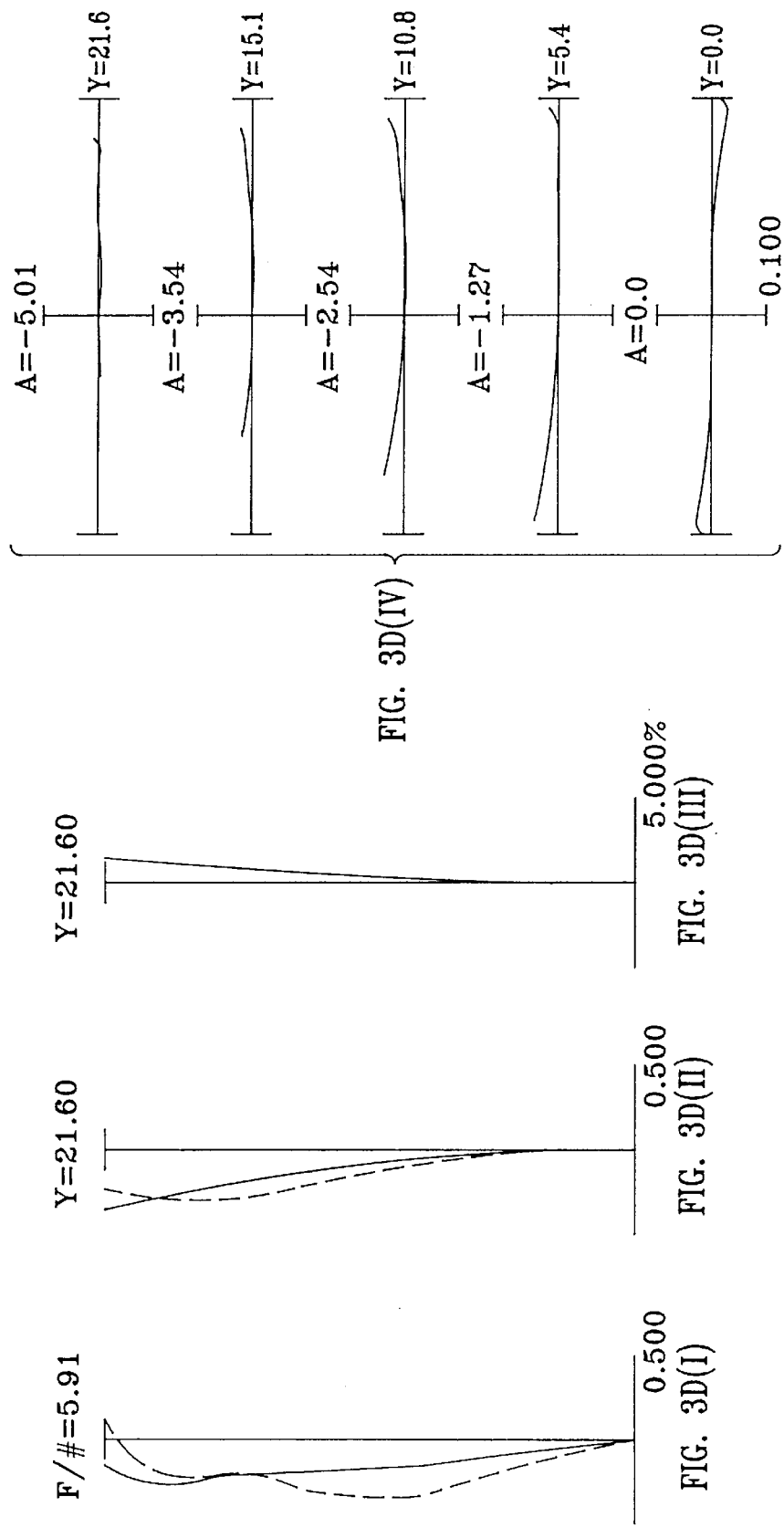

FIG. 3E(II)
FIG. 3E(III)
FIG. 3E(IV)

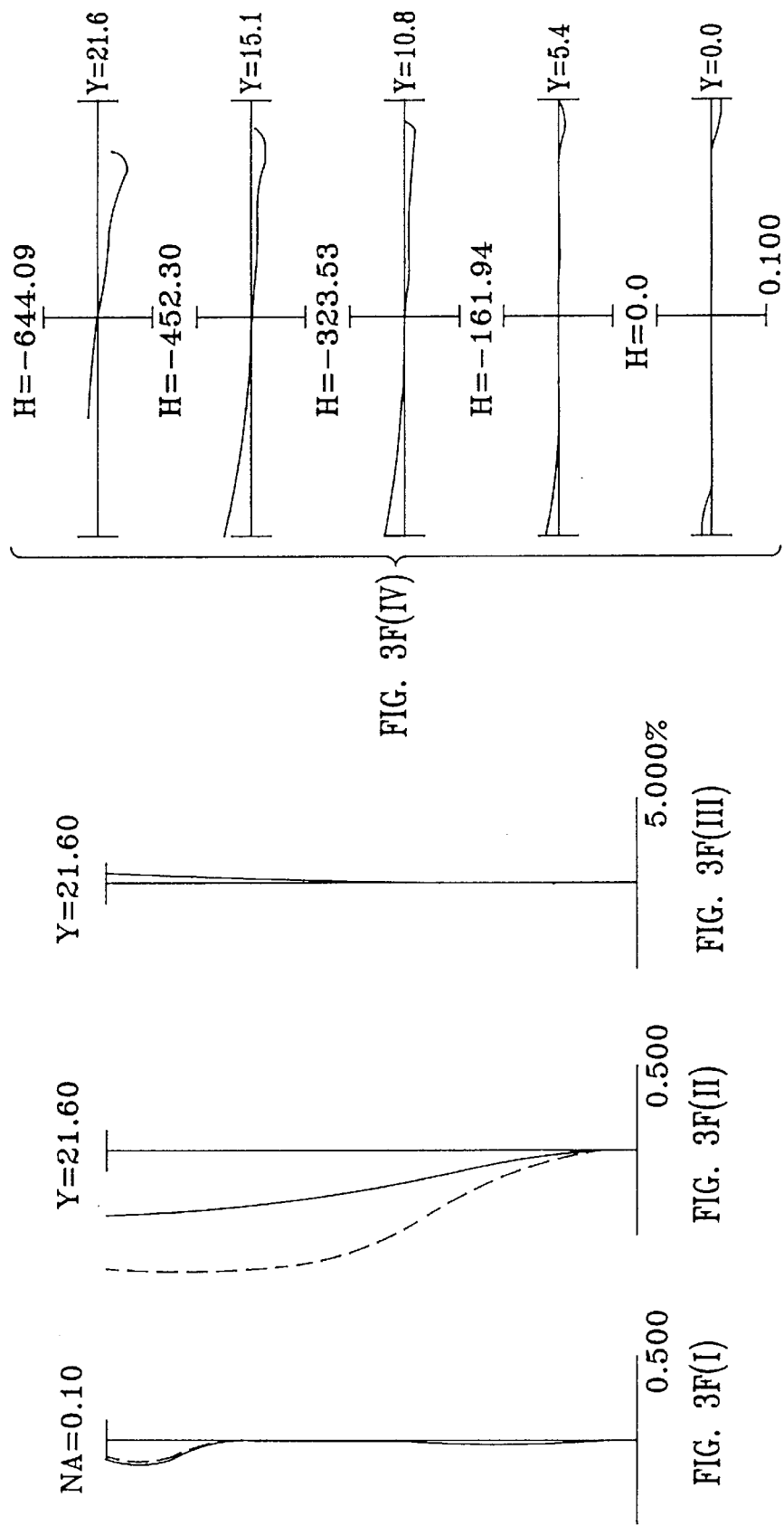

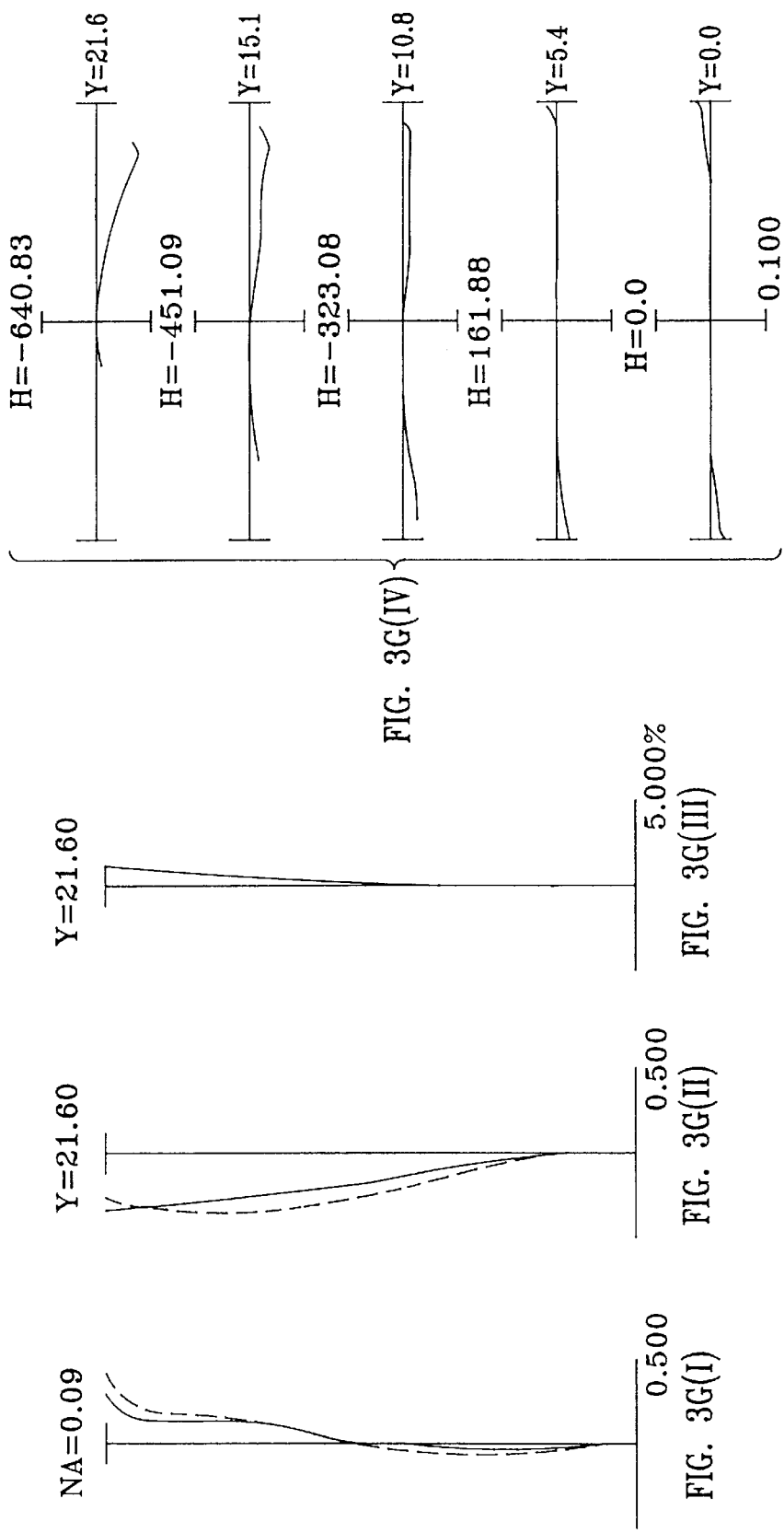

FIG. 3H(III)

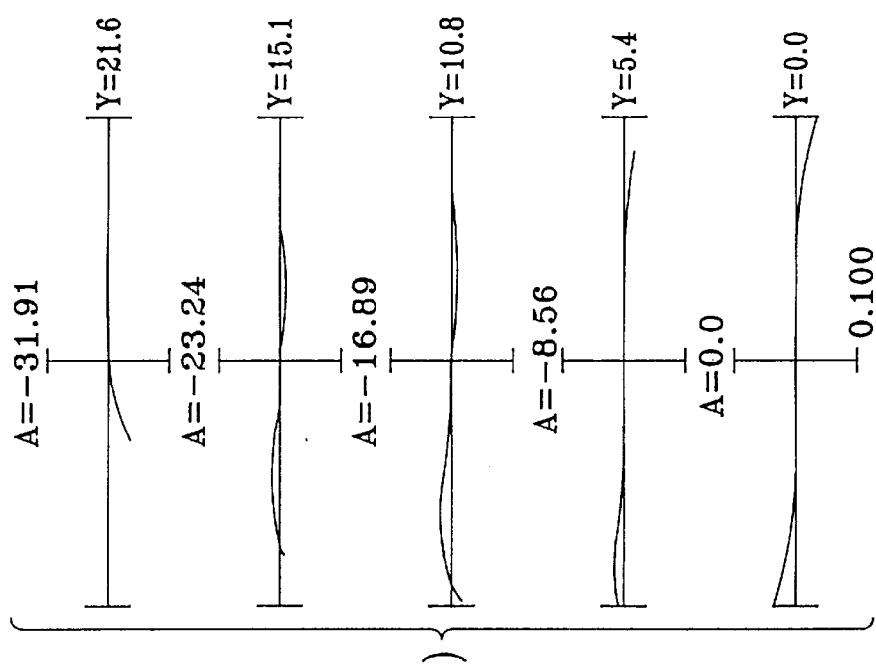
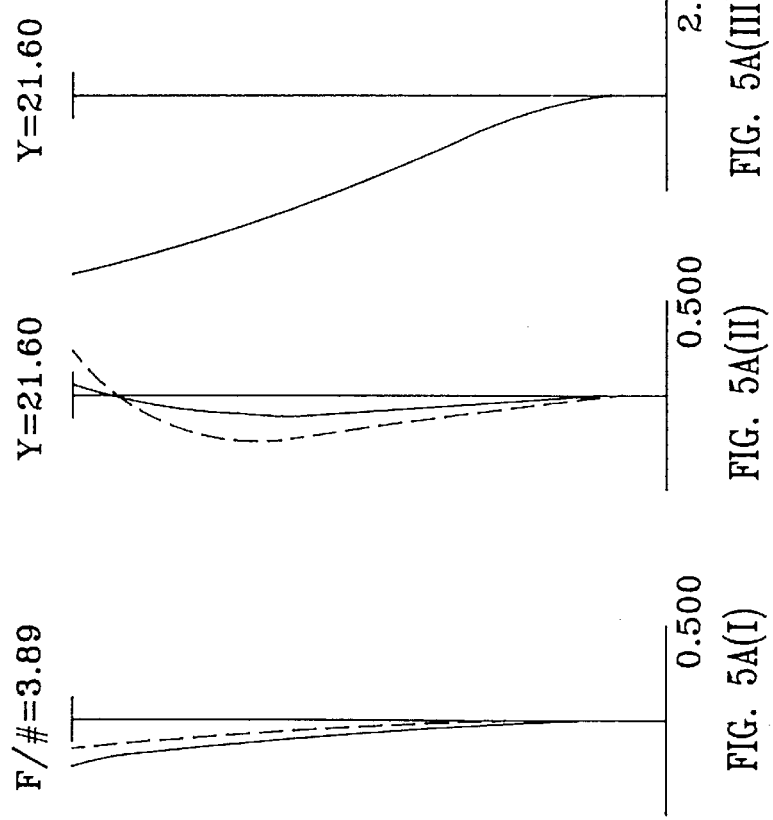
FIG. 5A(I)  FIG. 5A(II)  FIG. 5A(III)
FIG. 5A(IV)

FIG. 5B(IV)

FIG. 5B(III)

FIG. 5B(II)

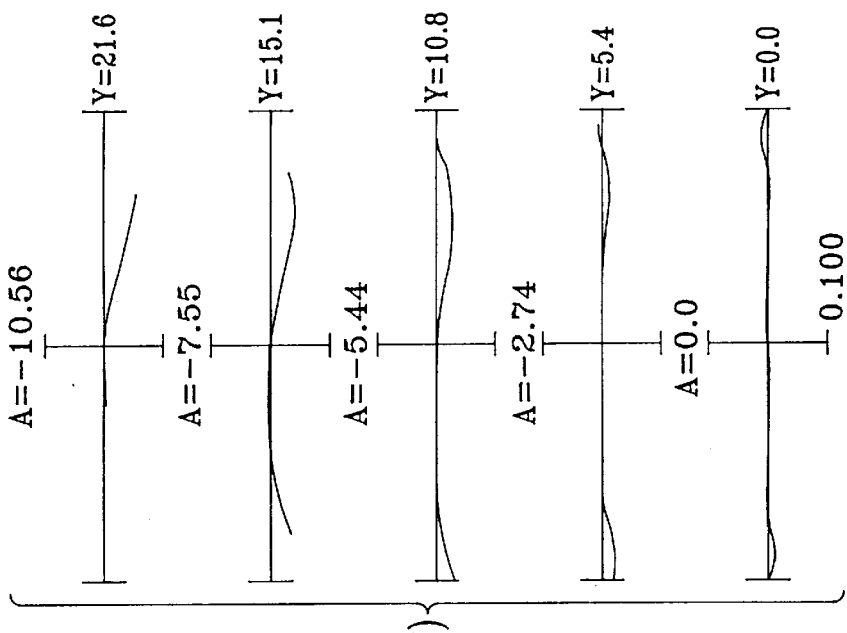
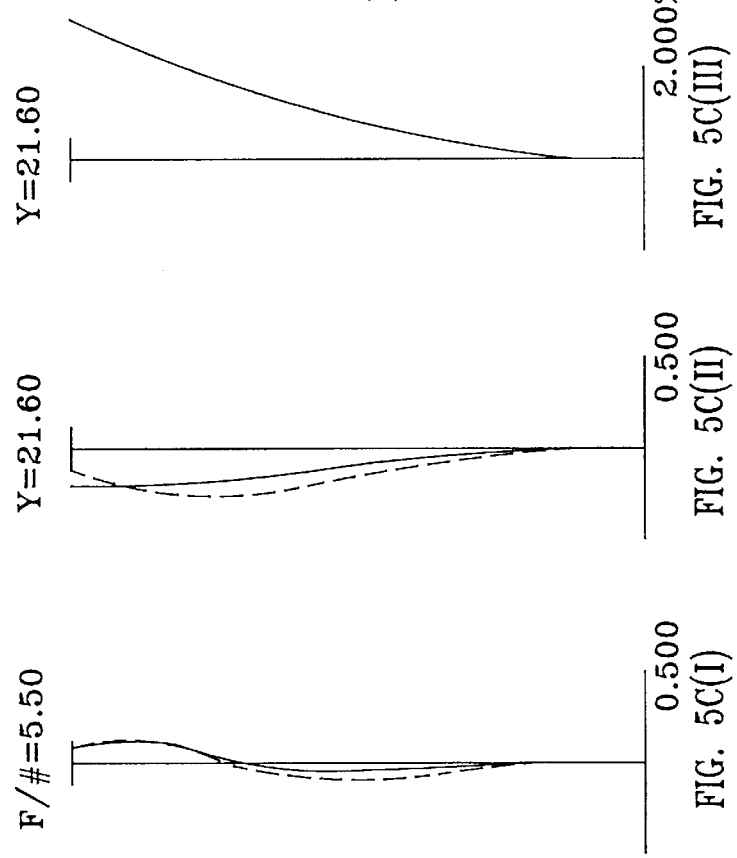

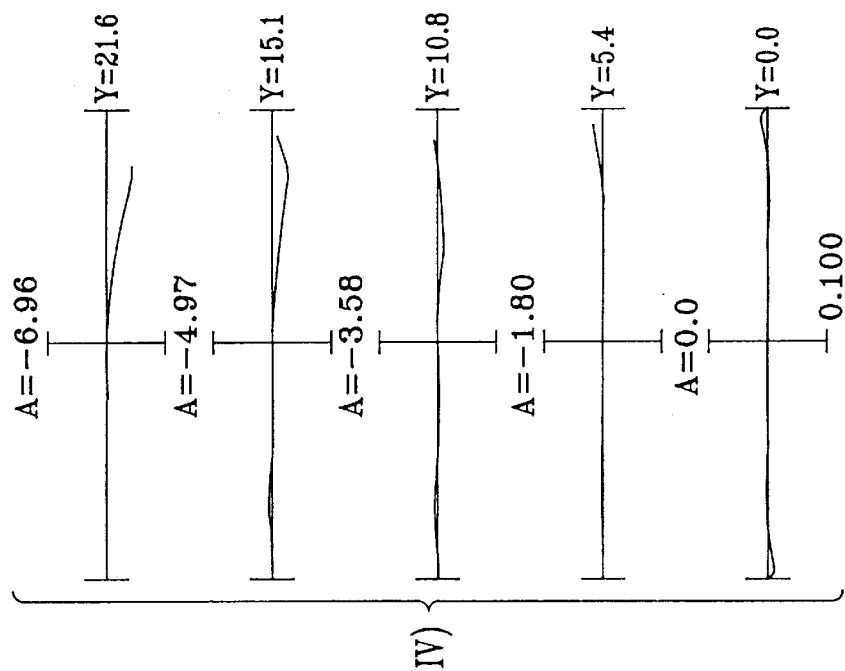
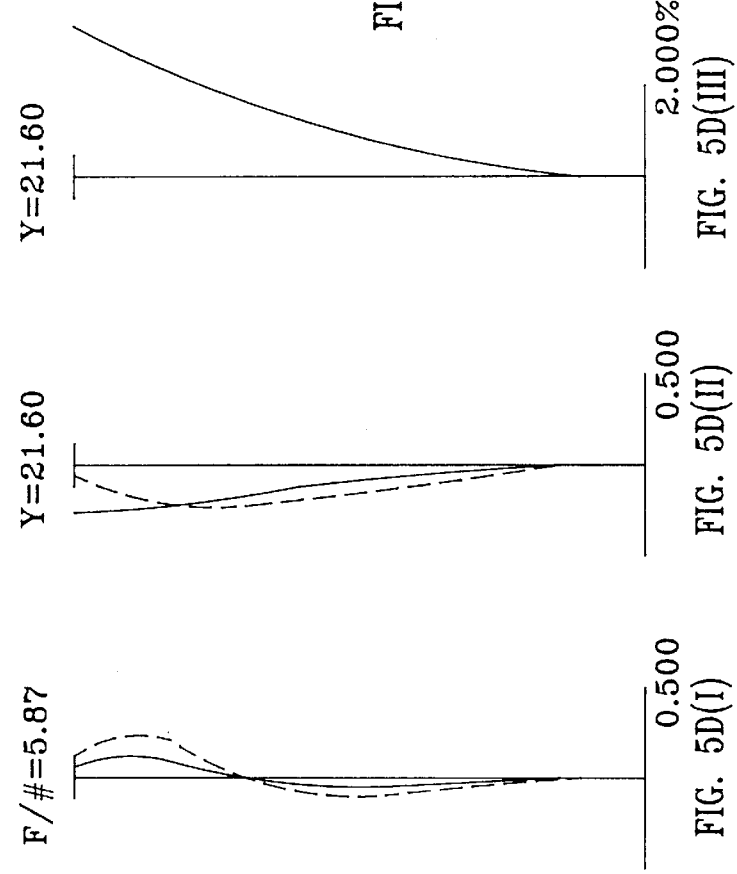

FIG. 5E(II)
FIG. 5E(III)
FIG. 5E(IV)

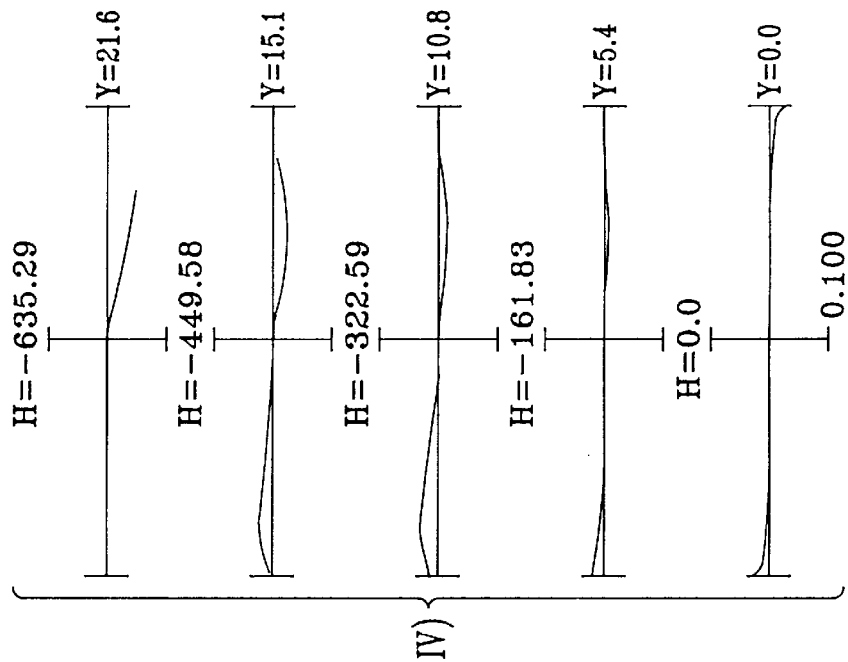
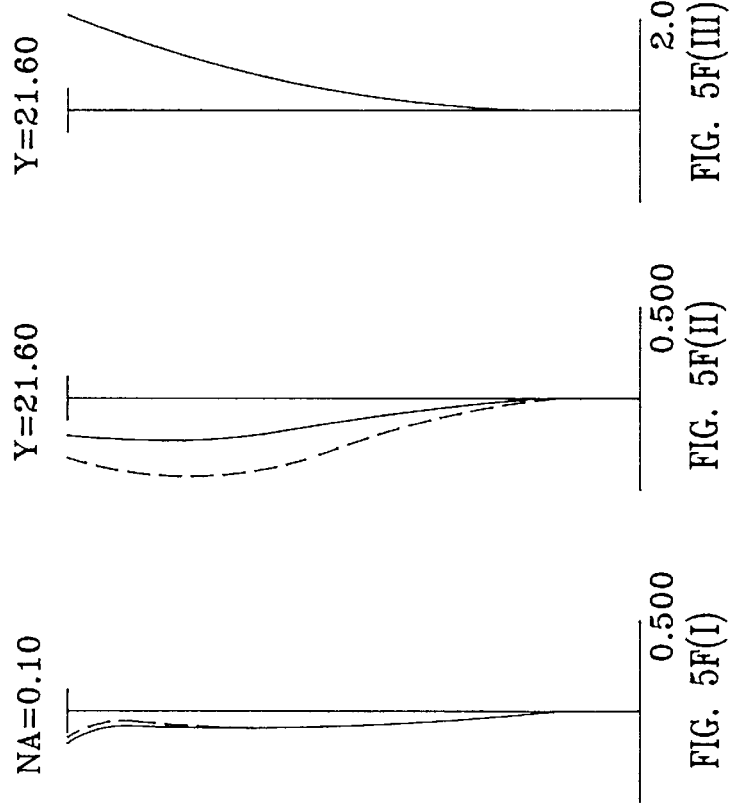

FIG. 5G(IV)

FIG. 5G(III)

FIG. 5G(II)

FIG. 5H(II)
FIG. 5H(III)
FIG. 5H(IV)

COMPACT HIGH-ZOOM-RATIO ZOOM LENS

FIELD OF THE INVENTION

The present invention relates to zoom lenses, and more particularly to compact zoom lenses having a high zoom ratio

BACKGROUND OF THE INVENTION

In recent years, zoom lenses have become popular lenses in imaging devices such as photographic and video cameras. Presently, high-zoom-ratio zoom lenses (i.e., zoom lenses having a zoom ratio greater than three) represent the state of the art and are standard on most advanced lens-shutter cameras and video equipment. The zoom lens for a lens-shutter type camera is most often integrated with the camera body and not readily detachable. Thus, it is useful for such cameras to be compact and lightweight. Not surprisingly, this has resulted in a demand for increasingly compact and lightweight zoom lenses having a high zoom ratio.

However, if the maximum telephoto state focal length is increased to increase the zoom ratio, the overall lens length and lens diameter increases, making the lens non-compact. On the other hand, if the maximum wide-angle state focal length is decreased to increase the zoom ratio, the amount of light at the margins of the field becomes attenuated, i.e., the image irradiance at the edges of the field is diminished due to the "cosine-to-the-fourth" dependence of image irradiance with field angle. Consequently, the marginal ray heights need to be increased to provide a sufficient amount of light at the margins of the field. This requires the lens diameter to be increased, resulting in a non-compact design.

Presently, the conventional zoom lens for a single-lens reflex (SLR) 35 mm camera having a mid-range focal length of about 50 mm is a retro-focus arrangement. An often-used retro-focus arrangement is a four-group construction-type comprising, from objectwise to imagewise, a positive lens group, a negative lens group, a positive lens group, and a positive lens group. Such a zoom lens has several advantages over other designs. For example, in a positive-negative-positive three-group construction-type, it is difficult to achieve a high zoom ratio while maintaining high-quality imaging performance. In fact, the more robust four-lens group construction-type is derived from the three-lens group construction-type by dividing the most imagewise positive lens group in the three-lens group construction-type into two separate and axially movable positive lens groups. This four-lens group construction-type allows the air space between these last two lens groups to be varied, providing for better control of aberrations while zooming.

Another advantage of the above four-lens group construction-type is that the second lens group can have strong negative refractive power, which is needed to keep the Petzval sum in check. Still another advantage is that the refractive power of the individual lens groups can be significantly strengthened to achieve a higher zoom ratio and greater compactness. This is possible because as the refractive power of the first lens group increases, the axial separation between the first and third lens groups can be reduced by increasing the negative refractive power of the second lens group.

Thus, efforts to develop a more compact, high-zoom-ratio zoom lens have been directed towards improving the positive-negative-positive-positive construction-type. In particular, efforts have been directed to shrinking the axial length in the maximum telephoto state, while decreasing the lens diameter in the maximum wide-angle state.

However, this approach has its limits and cannot be applied ad infinitum, mainly for two reasons. The first reason is that for positive-negative-positive-positive construction-type zoom lenses, the aperture stop is generally located objectwise and adjacent the third or fourth lens group. This reduces the ability of the lens elements in the second lens group to perform aberration correction because the ray heights do not vary significantly over the zooming range. Consequently, the number of lens elements needed to correct aberrations increases, which increase costs and prevents compactness from being achieved. Further, aspherical lens elements are usually required to obtain high-quality imaging, which can drastically increase cost. The second reason is that in the continued attempt to achieve compactness, the refractive power of the second lens group needs to be increased, as mentioned above. Eventually, however, this power starts to become disproportionate with respect to the other lens groups, making aberration control very difficult.

SUMMARY OF THE INVENTION

The present invention is a five-lens group construction type compact zoom lens design having a high zoom ratio, robust close-range focusing ability, and a positive-negative-negative-positive-positive lens group refractive power arrangement. The design of the zoom lens of the present invention is derived from a positive-negative-positive-positive four-lens group construction-type, wherein the second lens group of the four-lens group construction-type is divided into two negative lens groups. This allows for independent axial motion of the two negative lens groups, which in turn allows for control of aberrations over the zooming range to maintain high-performance imaging, as well as a high zoom ratio. It also allows for close-range focusing with minimal lens group movement.

In a preferred embodiment, the zoom lens of the present invention comprises five lens groups arranged in a positive-negative-negative-positive-positive refractive power arrangement. The zoom lens has a range of focal length states, including a maximum wide-angle state corresponding to a minimum focal length and a maximum telephoto state corresponding to a maximum focal length. The focal length of the zoom lens in the wide-angle and maximum telephoto states is $f_W$ and $f_T$, respectively.

The first lens group is axially movable, has positive refractive power, and has a focal length $f_1$. The second lens group is axially movable, has negative refractive power, and a focal length $f_2$. Further, the second lens group is axially separated from the first lens group by a variable axial separation D1, including a maximum wide-angle state axial separation $D1_W$ and a maximum telephoto state axial separation $D1_T$. The third lens group is axially movable, has negative refractive power, and a focal length $f_3$. Further, the third lens group is axially separated from the second lens group by a variable axial separation D2, including a maximum wide-angle state axial separation $D2_W$ and a maximum telephoto state axial separation $D2_T$.

The fourth lens group is axially movable, has positive refractive power, and is axially separated from the third lens group by a variable axial separation D3. The fifth lens group is axially movable, has positive refracting power, and is axially separated from the fourth lens group by a variable axial separation D4.

In a preferred embodiment, the first lens group comprises a positive compound lens consisting of a negative meniscus-shaped lens element whose surface closest to the object is convex (hereinafter, "objectwise convex surface") and a positive meniscus-shaped lens element having an objectwise convex surface, and a positive meniscus-shaped lens element having an objectwise convex surface. Further, the second lens group comprises a negative meniscus-shaped lens element having an objectwise convex surface, a biconcave lens element, and a biconvex lens element. In addition, the third lens group comprises a negative compound lens consisting of a biconcave lens element and a positive meniscus-shaped lens element having an objectwise convex surface.

In one preferred embodiment, the fourth lens group comprises two biconvex lens elements and a biconcave lens element, while the fifth lens group comprises a biconvex lens element, a biconvex lens element, a negative meniscus-shaped lens element having an objectwise convex surface, a biconvex lens element, and a negative meniscus-shaped lens element whose surface closest to the object is concave (hereinafter, "objectwise concave surface").

In another embodiment, the fourth lens group comprises a biconvex lens element, a positive meniscus-shaped lens element having an objectwise convex surface, and a negative meniscus-shaped lens element having an objectwise concave surface, while the fifth lens group comprises a biconvex lens element, a positive compound lens consisting of a biconvex lens element and a biconcave lens element, a biconvex lens element, and a negative meniscus-shaped lens element having an objectwise concave surface.

In another preferred embodiment, the aperture stop is preferably disposed imagewise of the third lens group and objectwise of the fifth lens group. Also, during zooming from the maximum wide-angle state to the maximum telephoto state, the variable axial separation D1 increases, the variable separation D2 increases, the variable separation D3 decreases, and the variable separation D4 changes. Also, focusing is achieved by axially moving the third lens group.

In an additional preferred embodiment, the above-described zoom lenses satisfy the conditions $$-0.5 < (f_2 - f_3)/(f_2 \cdot f_3)^{1/2} < 0.3; \quad (1)$$

$$0.8 < f_1/(f_W \cdot f_T)^{1/2} < 1.4; \quad (2)$$

and at least one of the following conditions:

$$0.07 < (D2_T - D2_W)(f_W \cdot f_T)^{1/2}/(f_2 \cdot f_3) < 0.35; \quad (3)$$

$$-0.5 < [f_1 + f_2 - (D1_T - D1_W)/2]/(f_W \cdot f_T)^{1/2} < 0.75. \quad (4)$$

BRIEF DESCRIPTION OF THE DRAWINGS

FIGS. 3A(I)–3A(IV) are plots of spherical aberration, astigmatism, distortion, and coma, respectively, for Working Example 1, maximum wide-angle state (focusing on an object at infinity);

FIGS. 3C(I)–3C(IV) are plots of spherical aberration, astigmatism, distortion, and coma, respectively, for Working Example 1, at a second intermediate focal length, focusing on an object at infinity;

FIGS. 3D(I)–3D(IV) are plots of spherical aberration, astigmatism, distortion, and coma, respectively, for Working Example 1, maximum telephoto state (focusing on an object at infinity);

FIGS. 3F(I)–3F(IV) are plots of spherical aberration, astigmatism, distortion, and coma, respectively, for Working Example 1, at a first intermediate focal length, photomagnification ratio=1/30;

FIGS. 3G(I)–3G(IV) are plots of spherical aberration, astigmatism, distortion, and coma, respectively, for Working Example 1, at a second intermediate focal length, focusing on a finite-distant object, photomagnification ratio=1/30;

FIG. 5A(I)–5A(IV) are plots of spherical aberration, astigmatism, distortion, and coma, respectively, for Working Example 2, maximum wide-angle state (focusing on an object at infinity);

FIGS. 5C(I)–5C(IV) are plots of spherical aberration, astigmatism, distortion, and coma, respectively, for Working Example 2, at a second intermediate focal length, focusing on an object at infinity;

FIGS. 5D(I)–5D(IV) are plots of spherical aberration, astigmatism, distortion, and coma, respectively, for Working Example 2, maximum telephoto state (focusing on an object at infinity);

FIGS. 5F(I)–5F(IV) are plots of spherical aberration, astigmatism, distortion, and coma, respectively, for Working Example 2, at a first intermediate focal length, focusing on a finite-distant object, photomagnification ratio=1/30;

DETAILED DESCRIPTION OF THE INVENTION

The present invention is a five-lens group construction-type compact zoom lens design having a high zoom ratio, robust close-range focusing ability, and a positive-negative-negative-positive-positive lens group refractive power arrangement. The design of the zoom lens of the present invention is based on the aforementioned positive-negative-positive-positive four-lens group construction-type, wherein the second lens group of the four-lens group construction-type is divided into two negative lens groups, in a similar fashion to how the four-lens group construction-type was derived from the positive-negative-positive three lens group construction-type. As described in more detail below, this allows for independent axial motion of the two negative lens groups, which in turn allows for control of aberrations over the zooming range to maintain high-performance imaging, as well as a high zoom ratio. It also allows for close-range focusing with minimal lens group movement.

Figure 1:
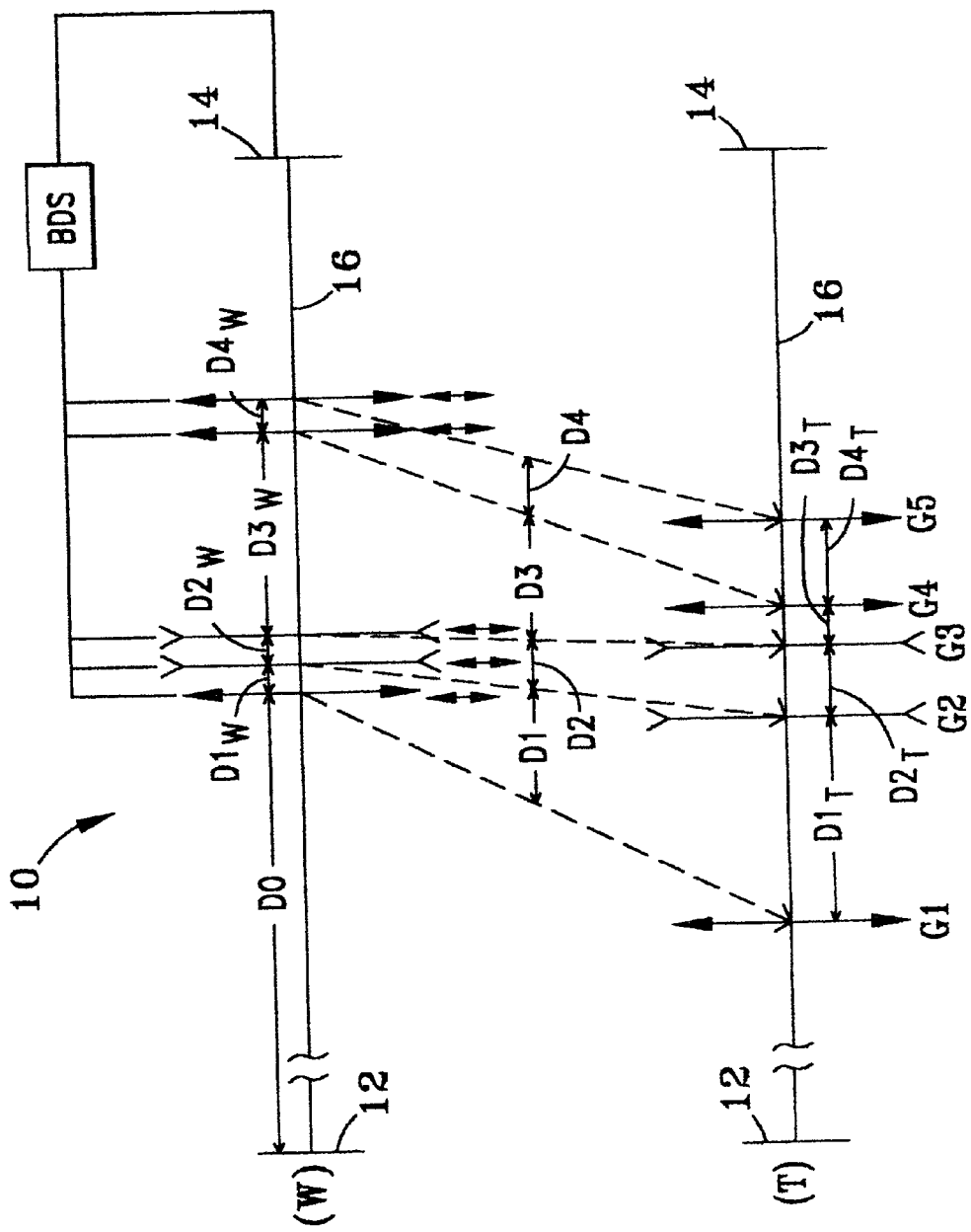
FIG. 1 is a schematic optical diagram of the lens groups comprising the zoom lens of the present invention, with dashed-line arrows depicting one form of axial movement of each lens group when zooming from maximum wide-angle state (W) to maximum telephoto state (T)

With reference to FIG. 1, the zoom lens 10 of the present invention comprises, from object 12 to image 14, a first lens group G1 having positive refractive power, a second lens group G2 having negative refractive power, a third lens group G3 having negative refractive power, a fourth lens group G4 having positive refractive power, and a fifth lens group G5 having positive refractive power. When zooming from wide angle mode W to maximum telephoto state T, each lens group moves along optical axis 16 (hereinafter, "moves axially") toward object 12 so that as the axial separation D1 between lens groups G1 and G2 increases, the axial separation D2 between lens groups G2 and G3 increases, the axial separation D3 between G3 and G4 decreases, and the axial separation D4 between lens groups G4 and G5 changes.

The zoom lens 10 of the present invention includes five lens groups all moving axially with respect to one another to effectuate a change in zoom lens focal length when zooming from the maximum wide-angle state to the maximum telephoto state. It is known in the art of optical design that for two lens elements or lens groups having refractive powers $\phi 1$ and $\phi 2$, respectively, and an axial separation d, their combined refractive power $\phi$ is given by the equation $$\phi = \phi 1 + \phi 2 - (\phi 1 \cdot \phi 2 \cdot d).\quad\quad\quad\quad\quad\quad\quad\quad\quad\quad\text{[eq. 1]}$$

If the axial separation d is increased incrementally by $\Delta$, then the combined refractive power $\phi'$ is given by the equation $$\phi' = \phi 1 + \phi 2 - \phi 1 \cdot \phi 2 \cdot (d+\Delta).\quad\quad\quad\quad\quad\quad\quad\text{[eq. 2]}$$

Therefore, the change in combined refractive power, $\Delta\phi$, due to the incremental change $\Delta$ in the axial separation d, is given by the equation $$\Delta\phi = \phi' - \phi = -\phi 1 \cdot \phi 2 \cdot \Delta\quad\quad\quad\quad\quad\quad\quad\quad\quad\text{[eq. 3]}$$

As can be seen from equation [3], if the signs of the refractive powers of the two lens elements or groups are the same, the change in combined refractive power becomes increasingly negative as the separation $\Delta$ between the two lens groups increases. Conversely, if the signs of the refractive powers of the two lens groups are opposite, the change in combined refractive power becomes increasingly positive as the separation $\Delta$ between the two lens groups increases.

With continued reference to FIG. 1, to meet the goals achieving a high degree of compactness while maintaining sufficient aberration correction to offer high-performance imaging and a high zoom ratio, it is preferred that the zoom lens 10 of the present invention have the following design properties:

(i) in maximum wide-angle state W, axial separations D1 and D2 are smallest, so that lens groups G1, G2 and G3 are closest together, thereby resulting in the combined refractive power of lens groups G1–G3 being the strongest negative. Meanwhile, axial separation D4 is smallest, thereby resulting in a combined G4–G5 refractive power that is the strongest positive. Axial separation D3 is set to balance overall zoom lens power and to provide the best aberration correction;

(ii) when zooming from maximum wide-angle state W to maximum telephoto state T, at least lens group G1 moves axially toward object 12 so that axial separation D1 increases;

(iii) when zooming from maximum wide-angle state W to maximum telephoto state T, axial separation D3 between lens groups G3 and G4 decreases, axial separation D2 between lens groups G2 and G3 increases, and axial separation D4 between lens groups G4 and G5 changes;

(iv) the lateral magnifications $\beta_2$ and $\beta_3$ of second lens and third lens groups G2 and G3 respectively, have the property $$-1 < 1/\beta_2 < 1 \quad\quad\quad\quad\quad\quad\quad\quad\quad\quad\quad\quad\text{[eq. 4]}$$

$$-1 < \beta_3 < 1 \quad\quad\quad\quad\quad\quad\quad\quad\quad\quad\quad\quad\quad\quad\text{[eq. 5]}$$

over the entire zooming range; and (v) the aperture stop AS (not shown in FIG. 1) is arranged either objectwise of fourth lens group G4, within fourth lens group G4, or within fifth lens group G5.

In light of the above preferred design properties, several design conditions are preferably satisfied to meet the above-identified goals of the present invention. These design conditions are set forth immediately below.

The first condition pertains to the balance of focal lengths $f_2$ and $f_3$ of second and third lens groups G2 and G3, respectively, necessary to control both on-axis and off-axis aberrations over the zooming range. The condition is expressed as $$-0.5 < (f_2 - f_3)/(f_2 \cdot f_3)^{1/2} < 0.3. \quad\quad\quad\quad\quad\quad\quad\quad(1)$$

If $(f_2-f_3)/(f_2 \cdot f_3)^{1/2}$ exceeds the upper limit of condition (1), then $f_2$ becomes too large and the refractive power of lens group G2 is insufficient to control off-axis rays in the maximum wide-angle state. Consequently, aberration control in the maximum wide-angle state is problematic.

Conversely, if $(f_2-f_3)/(f_2 \cdot f_3)^{1/2}$ falls below the lower limit of condition (1), then $f_3$ becomes too large and the refractive power of lens group G3 is insufficient to correct positive spherical aberration using a minimum number of lens elements.

The second design condition pertains to the allowable range of focal length $f_1$ of first lens group G1 in attempting to reduce the overall lens length and lens diameter. The condition is expressed as:

$$0.8 < f_1/(f_W \cdot f_T)^{1/2} < 1.4 \quad\quad\quad\quad\quad\quad\quad\quad\quad\quad(2)$$

wherein $f_W$ is the focal length of the zoom lens in the maximum wide-angle state and $f_T$ is the focal length of the zoom lens in the maximum telephoto state.

If $f_1/(f_W \cdot f_T)^{1/2}$ exceeds the upper limit of condition (2), $f_1$ becomes too large (i.e., the refractive power of lens group G1 becomes too small) and the overall lens length increases, resulting in non-compactness. Setting the upper limit of condition (2) at a smaller value, such as 1.2, ensures a shorter overall lens length in the maximum telephoto state while maintaining the high degree of aberration correction necessary for high-performance imaging.

Conversely, if $f_1/(f_W \cdot f_T)^{1/2}$ falls below the lower limit of condition (2), $f_1$ becomes too small (i.e., the refractive power of lens group G1 becomes too large), so that off-axis rays passing through lens group G1 in the maximum wide-angle state are refracted too strongly. As a consequence, the diameter of lens group G1 needs to be increased to maintain a uniform image irradiance at the margins of the field. Unfortunately, this makes for a non-compact design.

The third design condition relates to limiting the variable axial separation D2 between lens groups G2 and G3 (see FIG. 1) to ensure these lens groups have a small number of lens elements. The condition is expressed as $$0.07 < (D2_T - D2_W)(f_W \cdot f_T)^{1/2}/(f_2 \cdot f_3) < 0.35. \quad (3)$$

wherein $D2_W$ and $D2_T$ are the axial separations between lens groups G2 and G3 in the wide-angle and maximum telephoto states, respectively (see FIG. 1). Based on equation [3], above, the expression in condition (3) can be expressed as $\Delta\phi \cdot (f_W \cdot f_T)^{1/2}$, wherein $\Delta\phi = (D2_T - D2_W)(f_W \cdot f_T)^{1/2}$. The quantity $\Delta\phi$ is the change in the combined G2–G3 refractive power during zooming from the maximum wide-angle state to the maximum telephoto state. Note that axial separation D2 between lens groups G2 and G3 is smallest in the wide angle mode (wherein $D2=D2_W$; see FIG. 1). According to equation [1], above, this condition makes the combined G2–G3 refractive power strongest. This ensures that off-axis light rays are refracted with sufficient strength to be directed along the optical axis 16 in the maximum wide-angle state. On the other hand, the axial separation D2 is greatest in the maximum telephoto state (where $D2=D2_T$; see FIG. 1). According to equation [1], above, this condition makes the combined G2–G3 refractive power weakest. Having weaker combined G2–G3 refractive power in the maximum telephoto state is necessary because off-axis light rays require less refraction to pass through the lens due to the narrower field angle.

Thus, the variation in the combined G2–G3 refractive power over the zooming range, when judiciously established via condition (3), allows for correction of off-axis aberrations which arise when zooming from the maximum wide-angle state to the maximum telephoto state.

If the expression $(D2_T - D2_W)(f_W \cdot f_T)^{1/2}/(f_2 \cdot f_3)$ exceeds the upper limit of condition (3), then the ray heights at second lens group G2 do not vary sufficiently for a change in field angle when the zoom lens is in the maximum telephoto state. As a consequence, it becomes difficult to maintain control over aberrations when zooming toward the maximum telephoto state.

If the expression $(D2_T - D2_W)(f_W \cdot f_T)^{1/2}/(f_2 \cdot f_3)$ falls below the lower limit of condition (3), then the heights at second lens group G2 do not vary sufficiently when zooming from the maximum wide-angle state to the maximum telephoto state. As a consequence, it becomes difficult to maintain control over aberrations at both ends of the zooming range.

The fourth design condition pertains to limiting the variable axial separation D1 between lens groups G1 and G2 to reduce the amount of axial movement of lens groups G2 required for focusing on a nearby object. The condition is expressed as $$-0.5 < [f_1 + f_2 - (D1_T - D1_W)/2]/(f_W \cdot f_T)^{1/2} < 0.75 \quad (4)$$

wherein $D1_W$ and $D1_T$ are the axial separations between lens groups G1 and G2 in the wide-angle and maximum telephoto states, respectively (see FIG. 1).

Zoom lenses require a focusing method for focusing on a nearby object (i.e., "close-range" focusing). A first method, called the front focus method, involves axially moving the most objectwise lens group. A second method, called the rear focus method, involves axially moving the most imagewise lens group. A third method, called an inner focus method, involves axially moving an inner lens group positioned between the most objectwise lens group and the most imagewise lens group.

A technique for reducing the amount of axial movement of lens groups using the inner focus method is described in Japanese Laid-Open Patent Application No. Hei 7-35979 filed by the present applicant. In this reference, it is disclosed that the amount of axial movement of the lens groups for close-range focusing can be reduced, and the configuration of the focusing mechanism simplified, by stipulating the appropriate value for the lateral magnifications of the focusing group between the wide-angle and maximum telephoto states.

Accordingly, as mentioned above with respect to preferred design property (iv), it is preferred that the lateral magnifications of the second and third lens groups G2 and G3 the equations $-1 < 1/\beta_2 < 1$ (equation [4]), and $-1 < \beta_3 < 1$ (equation [5]), over the zooming range. Thus, if lens group G2 made the focusing lens group, it is preferred that the value $1/\beta_2$ be close to zero to reduce the amount of axial movement of lens group G2 necessary for focusing. Further, if third lens group G3 is made the focusing group, it is preferred that $\beta_3$ be as close to zero as possible over the zooming range. Note that when $1/\beta_2 = 0$, then $\beta_3 = 0$. Because this condition results in a minimum amount of axial movement for focusing, a preferred zooming configuration is where the condition $1/\beta_2 = 0$ is satisfied in at least one imaging position between the wide-angle and maximum telephoto states.

Following equation [1], above, the combined G1–G2 refractive power, $\phi_{12}$, can be expressed as $$\phi_{12} = 1/f_1 + 1/f_2 - D1_p/(f_1 \cdot f_2) \quad [\text{eq. 6}]$$

wherein $D1_p$ is the axial separation between the principle points (not shown in FIG. 1) associated with lens groups G1 and G2. If $\phi_{12} = 0$, then equation [6] becomes $$f_1 + f_2 D1_p = 0. \quad [\text{eq. 7}]$$

Thus, based on equation [6], close-range focus with minimal axial movement of lens group G2 is achieved when the (actual) axial separation D1 between lens groups G1 and G2 is $$D1 = (D1_T - D1_W)/2. \quad [\text{eq. 8}]$$

It is important to note that $D1_T$ and $D1_W$ are the actual separations between lens groups G1 and G2, and not the axial separation between the principal points associated with these lens groups. As such, it is necessary that the left hand side of equation [7] be identically zero.

Thus, returning to condition (4), above, the amount of axial movement of lens groups G2 or G3 required for focusing is minimized by maintaining the value of $[f_1 + f_2 - (D1_T - D1_W)/2]/(f_W \cdot f_T)^{1/2}$ between the upper and lower limits set forth therein. Setting the upper limit to a smaller value, such as 0.5, and setting the lower limit to a larger value, such as −0.3, ensures that the amount of axial movement required for close-range focusing is nearly the same for both the wide-angle and maximum telephoto states.

A preferred embodiment of the present invention includes a blurring detection system BDS (see FIG. 1) that detects image blurring (i.e., fluctuations in image position) prevalent in high zoom ratio zoom lenses due to camera movement and the like. The blurring detection system and the driving means for driving the lens groups to achieve zooming can be combined to prevent or reduce image blurring. Thus, the zoom lens of the present invention can be made into a so-called "anti-vibration optical system" by decentering (i.e., moving perpendicular to optical axis 16; see FIG. 1) all or part of at least one of the lens groups. This causes a shift in the image, which can be used to correct image blurring as detected by the blurring detection system.

Working Examples

Working Examples 1 and 2 of the present invention are set forth in detail below in Tables 1 and 2, and in FIGS. 2 and 4, along with their corresponding aberration plots (FIGS. 3A–3H, and 5A–5H, respectively). In the aberration plots for astigmatism (FIGS. 3A(II)–3H(II) and 5A(II)–5H(II)), the solid line represents the sagittal image plane, and the broken line represents the meridional image plane. Also, in the plots for spherical aberration (FIGS. 3A(I)–3H(I) and 5A(I)–5H(I)) the broken line represents the sine condition.

In the Figures and Tables below, the following variables, in addition to those defined in the above conditions and equations, are used:

f=overall focal length of the zoom lens;

F/#=F-number;

2ω=field angle;

BFL=back focal length,

D=D-line ($\lambda$=587.6 nm);

g=g-line ($\lambda$=435.8 nm);

n=index with respect to the D-line;

A=half field-angle;

S=surface number;

R=radius of curvature of a lens element surface with a positive value having the center of curvature to the right of the lens surface;

d=distance between adjacent lens surfaces;

$\delta_n$=focus movement of lens group n d0=distance between the object and most objectwise lens element surface;

y=vertical distance from optical axis;

κ=conic constant;

S(y)=sag of optical surface; and $C_n$=n-th aspherical coefficient;

In each working example set forth below, the axial separations D1–D4, discussed above, correspond to d5, d11, d12, and d21 in the Tables. Also, an aspherical surface is expressed by the equation $$S(y)=(y^2/R)/(1+(1-\kappa \cdot y^2/R^2)^{1/2})+C_2 \cdot y^2+C_4 \cdot y^4+C_6 \cdot y^6+C_8 \cdot y^8+C_{10} \cdot y^{10}+\ldots \quad [eq. 9]$$

An asterisk (*) to the left side of the surface number indicates the surface is aspherical. Also, the direction from object to image is positive.

Working Example 1

Figure 2:
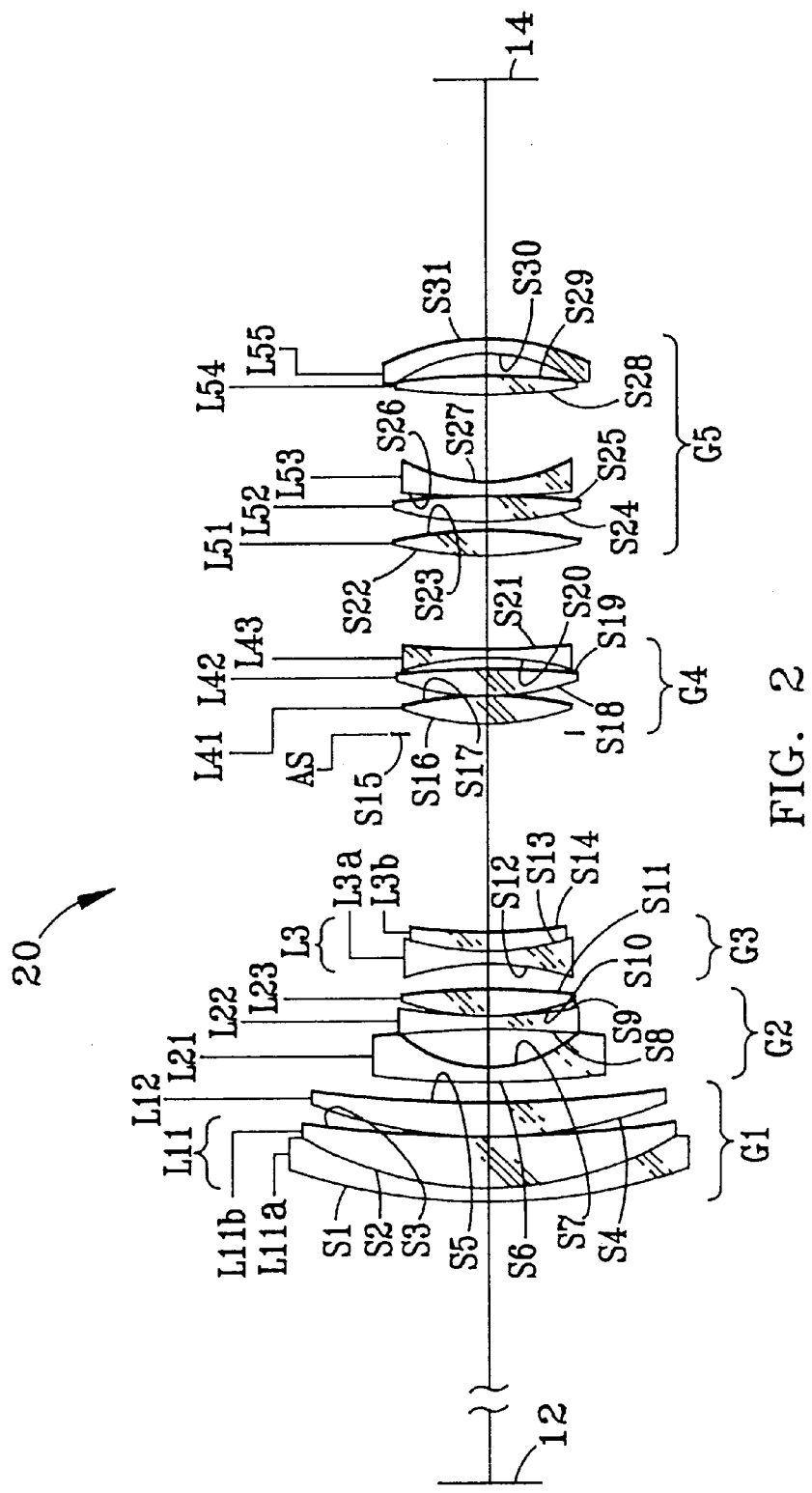
FIG. 2 is an optical diagram of Working Example 1 of the present invention in the maximum wide-angle state.
Figure 3B:
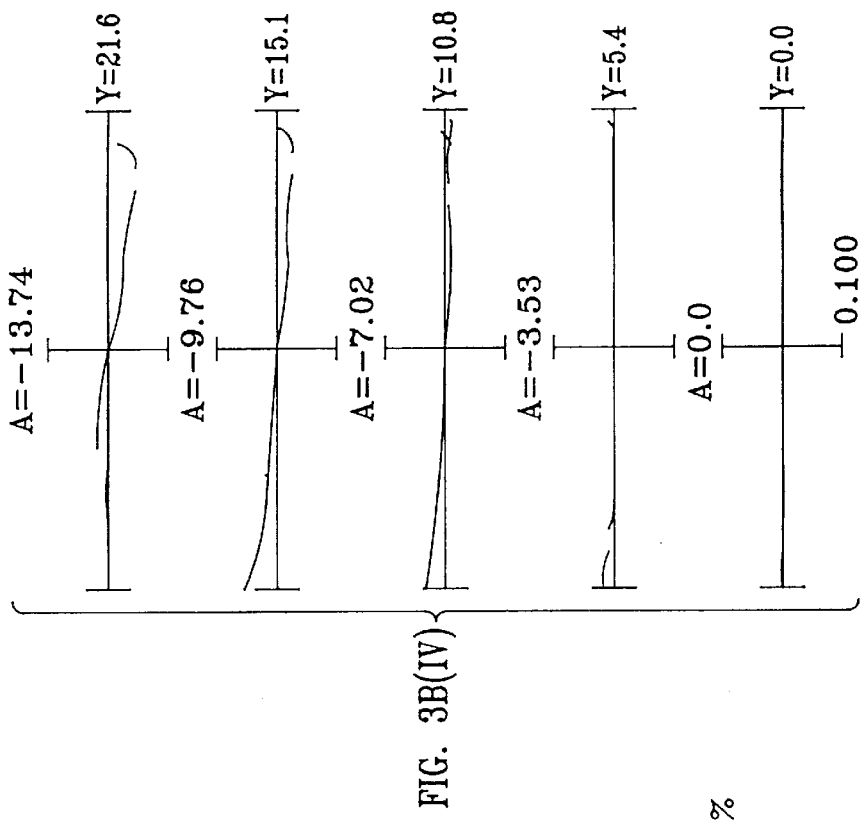
FIGS. 3B(I)–3B(IV) are plots of spherical aberration, astigmatism, distortion, and coma, respectively, for Working Example 1, at a first intermediate focal length, focusing on an object at infinity.
Figure 3B:
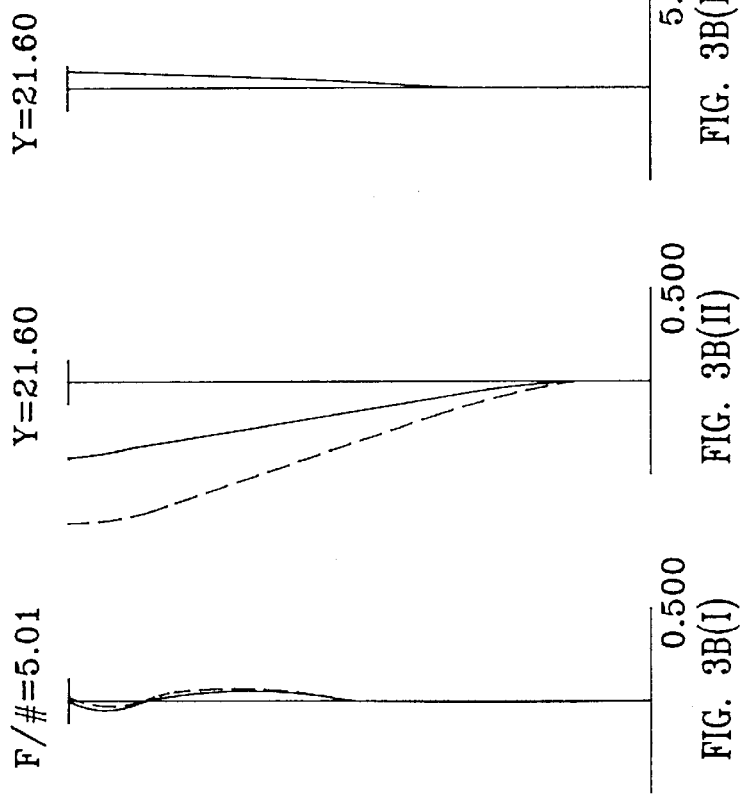
Figure 3E:
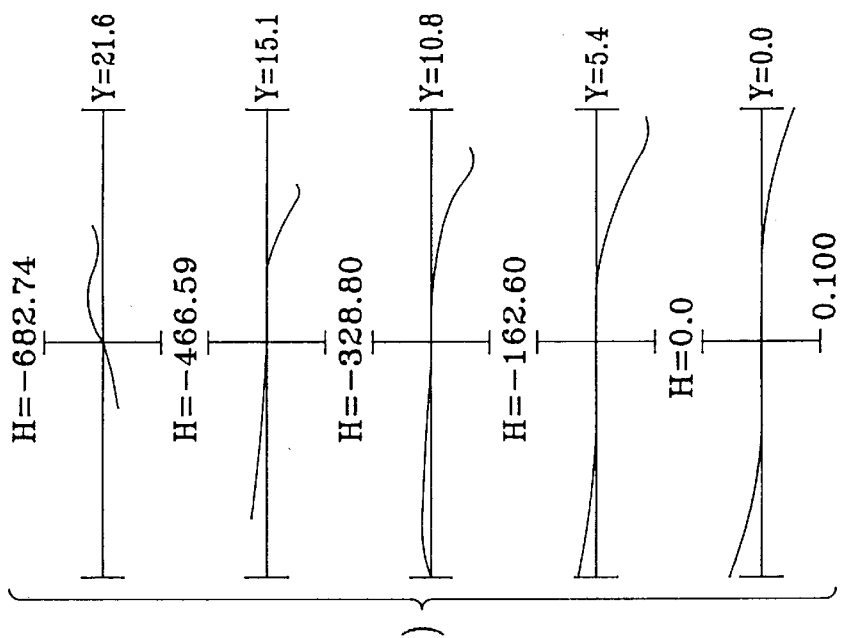
FIGS. 3E(I)–3E(IV) are plots of spherical aberration, astigmatism, distortion, and coma, respectively, for Working Example 1, maximum wide-angle state, focusing on a finite-distant object, photomagnification ratio=1/30.
Figure 3E:
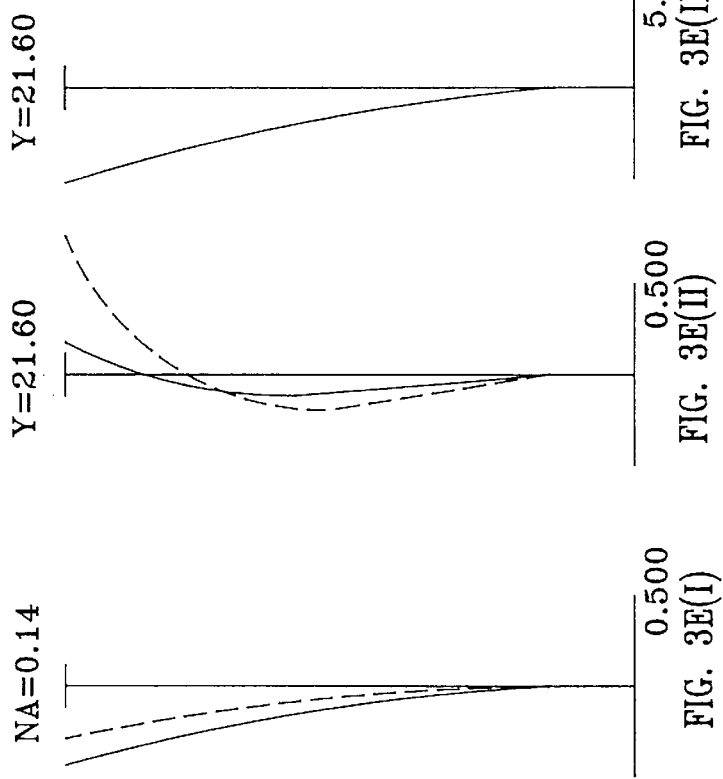
Figure 3H:
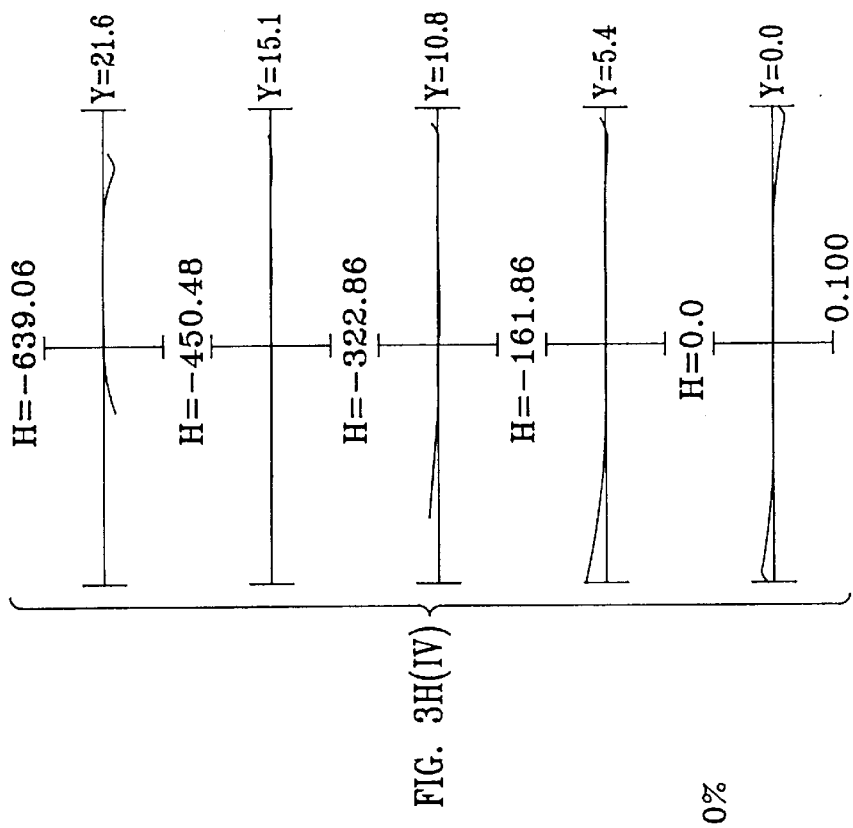
FIGS. 3H(I)–3H(IV) are plots of spherical aberration, astigmatism, distortion, and coma, respectively, for Working Example 1, maximum telephoto state, focusing on a finite-distant object, photomagnification ratio=1/30.
Figure 3H:
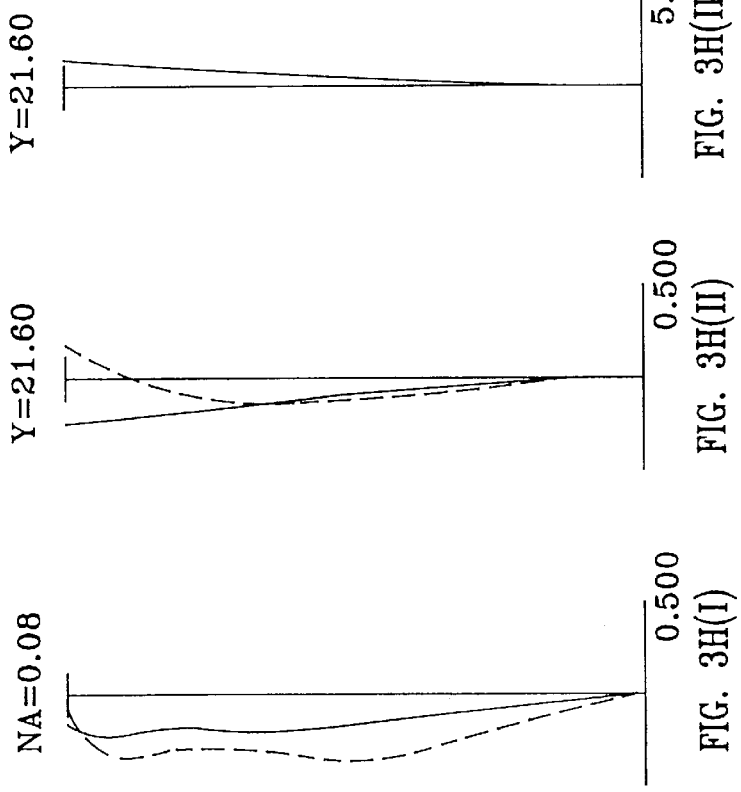

Zoom lens 20 of FIG. 2 represents Working Example 1 and comprises, from object 12 to image 14, first lens group G1 comprising a positive compound lens L11 consisting of a negative meniscus-shaped lens element L11a having an objectwise convex surface and a positive meniscus-shaped lens element L11b having an objectwise convex surface, and a positive meniscus-shaped lens element L12 having an objectwise convex surface; second lens group G2 comprising a negative meniscus-shaped lens element L21 having an objectwise convex surface, a biconcave lens element L22, and a biconvex lens element L23; third lens group G3 comprising a negative compound lens L3 consisting of a biconcave lens element L3a and a positive meniscus-shaped lens element L3b having an objectwise convex surface; fourth lens group G4 comprising a biconvex lens element L41, a biconvex lens element L42 and a biconcave lens element L43; and fifth lens group G5 comprising a biconvex lens element L51, a biconvex lens element L52, a negative meniscus-shaped lens element L53 having an objectwise convex surface, a biconvex lens element L54, and a negative meniscus-shaped lens element L55 having an objectwise concave surface.

In addition, aperture stop AS is disposed between third lens group G3 and fourth lens group G4 and moves with fourth lens group G4 during zooming. Also, focusing is achieved by axially moving third lens group G3.

The following Table 1 lists the specification values of Working Example 1 of the present invention.

TABLE 1 f = 36.00 − 87.50 − 175.00 − 242.50
F/# = 3.63 − 5.00 − 5.63 − 5.91
2ω = 63.80° − 27.58° − 13.99° − 10.02°

| S | R | d | n | ν |
|---|---|---|---|---|
| 1 | 80.989 | 1.875 | 1.84666 | 23.83 |
| 2 | 48.919 | 7.5 | 1.6516 | 58.44 |
| 3 | 188.3542 | 0.125 | | |
| 4 | 62.0956 | 5 | 1.6968 | 55.48 |
| 5 | 194.8188 | (d5 is variable) | | |
| 7 | 20.7737 | 5.125 | | |
| 8 | −184.8288 | 1.375 | 1.835 | 42.98 |
| 9 | 60.8835 | 0.125 | | |
| 10 | 34.5887 | 3.75 | 1.7847 | 26.06 |
| 11 | −110.2498 | (d11 is variable) | | |
| 12 | −31.8685 | 1.25 | 1.835 | 42.98 |
| 13 | 35.7163 | 2.75 | 1.84666 | 23.83 |
| 14 | 622.9335 | (d14 is variable) | | |
| 15 | ∞ | 0.875 | | (Aperture stop AS) |
| 16 | 37.8685 | 3.75 | 1.48749 | 70.44 |
| 17 | −50.6346 | 0.125 | | |
| 18 | 37.4303 | 3.75 | 1.48749 | 70.44 |
| 19 | −135.8284 | 1.25 | | |
| 20 | −42.1918 | 1.5 | 1.8061 | 33.27 |
| 21 | 196.9209 | (d21 is variable) | | |
| 22* | 33.2823 | 4.125 | 1.48749 | 70.44 |
| 23 | −53.4455 | 1.25 | | |
| 24 | 39.5636 | 3.75 | 1.48749 | 70.44 |
| 25 | −84.2589 | 0.125 | | |
| 26 | 136.4961 | 1.875 | 1.835 | 42.98 |
| 27 | 22.6633 | 12.5 | | |
| 28 | 291.4677 | 2.5 | 1.84666 | 23.83 |
| 29 | −129.444 | 3.25 | | |
| 30 | −22.5475 | 1.5 | 1.7725 | 49.61 |
| 31 | −39.1697 | BFL | | |

Aspherical surface data

| | κ | $C_2$ | $C_4$ |
|---|---|---|---|
| S6 | 0.0000 | 0.0000 | +3.59194 × 10$^{-6}$ |
| | $C_6$ | $C_8$ | $C_{10}$ |
| | −3.39411 × 10$^{-9}$ | +1.85240 × 10$^{-11}$ | −2.00749 × 10$^{-14}$ |
| S22 | 1.5645 | 0.0000 | −1.63820 X$^{-5}$ |
| | $C_6$ | $C_8$ | $C_{10}$ |
| | −1.20340 × 10$^{-8}$ | +9.72219 × 10$^{-11}$ | −3.45087 × 10$^{-13}$ |

Variable spacing when zooming

| f | 35.9992 | 87.4969 | 174.9924 | 242.4890 |
|---|---|---|---|---|
| d5 = D1 | 2.5000 | 22.2716 | 38.9528 | 44.2319 |
| d11 = D2 | 3.2478 | 3.7500 | 5.7286 | 6.2500 |
| d14 = D3 | 26.2348 | 14.6758 | 6.8524 | 2.1875 |

TABLE 1-continued f = 36.00 – 87.50 – 175.00 – 242.50
F/# = 3.63 – 5.00 – 5.63 – 5.91
2ω = 63.80° – 27.58° – 13.99° – 10.02°

| | | | | |
|---|---|---|---|---|
| d21 = D4 | 11.7914 | 5.1190 | 2.1064 | 1.2500 |
| BFL | 33.7487 | 58.3556 | 68.4495 | 73.2015 |

Focusing movement $\delta_3$ of third lens group G3
(focusing on a finite-distant object, photomagnification ratio = 1/30)

| | | | | |
|---|---|---|---|---|
| f | 35.9992 | 87.4969 | 174.9924 | 242.4890 |
| d0 | 1031.8764 | 2506.8358 | 4962.2252 | 6845.6214 |
| $\delta_3$ | 0.7604 | 0.6736 | 0.9681 | 1.1966 |

Corresponding values and design conditions:

$f_1 = 93.7195$
$f_2 = -54.5623$
$f_3 = -35.8698$
(1) $(f_2 - f_3)/(f_2 \cdot f_3)^{1/2} = -0.200$
(2) $f_1/f_W \cdot f_T)^{1/2} = 1.003$
(3) $(d11_T - d11_W)(f_W \cdot f_T)^{1/2}/(f_2 \cdot f_3) = 0.143$
(4) $[f_1 + f_2 - (d5_T - d5_W)/2]/(f_W \cdot f_T)^{1/2} = 0.392$ As is clear from the aberration plots of FIGS. 3A–3H, the configuration of this Working Example is well-corrected for aberrations over the zooming range (i.e., from maximum wide-angle state to the maximum telephoto state) and is suitable for achieving the objectives of the present invention.

Working Example 2

Figure 4:
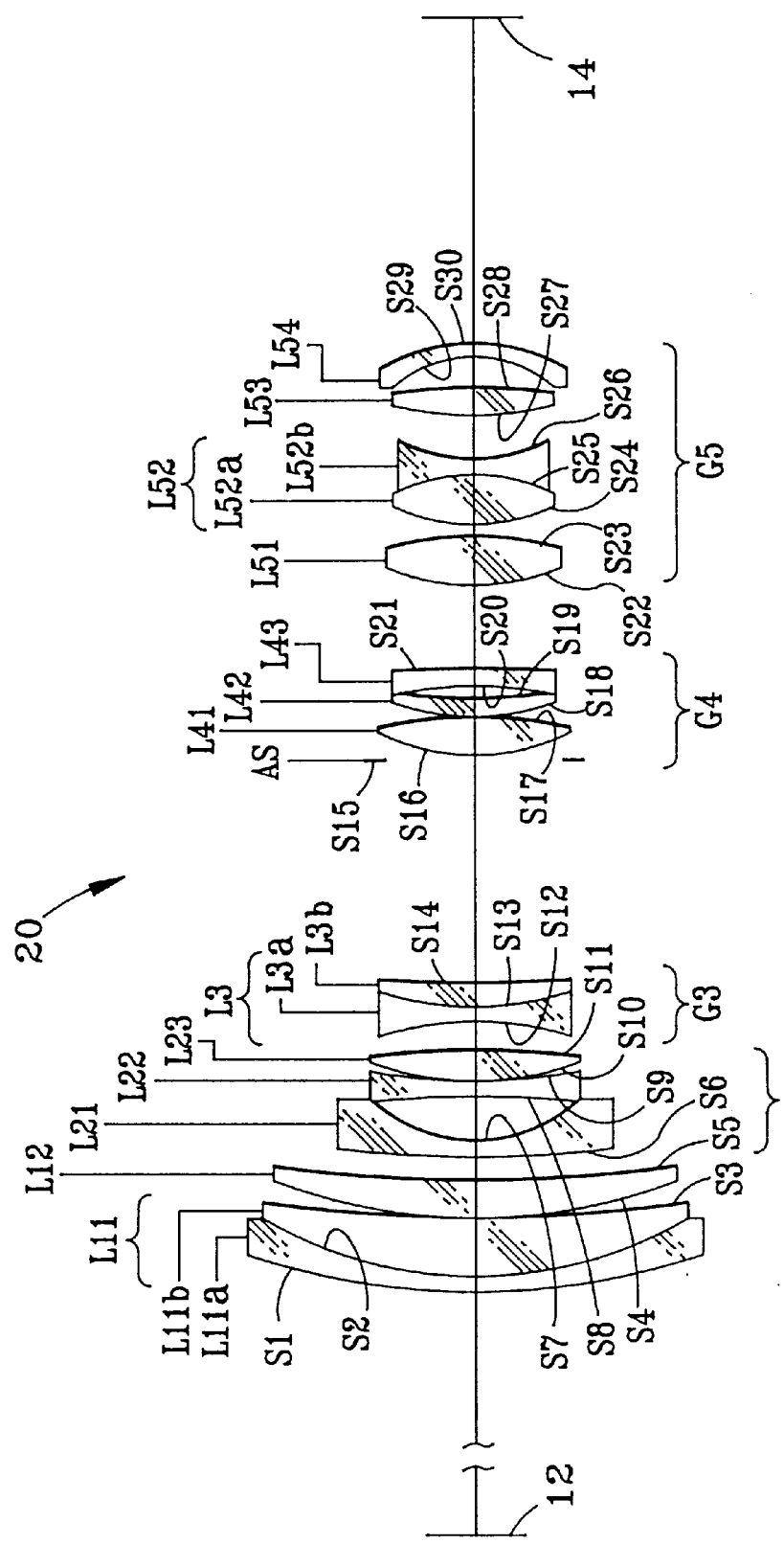
FIG. 4 is an optical diagram of Working Example 2 of the present invention in the maximum wide-angle state.
Figure 5B:
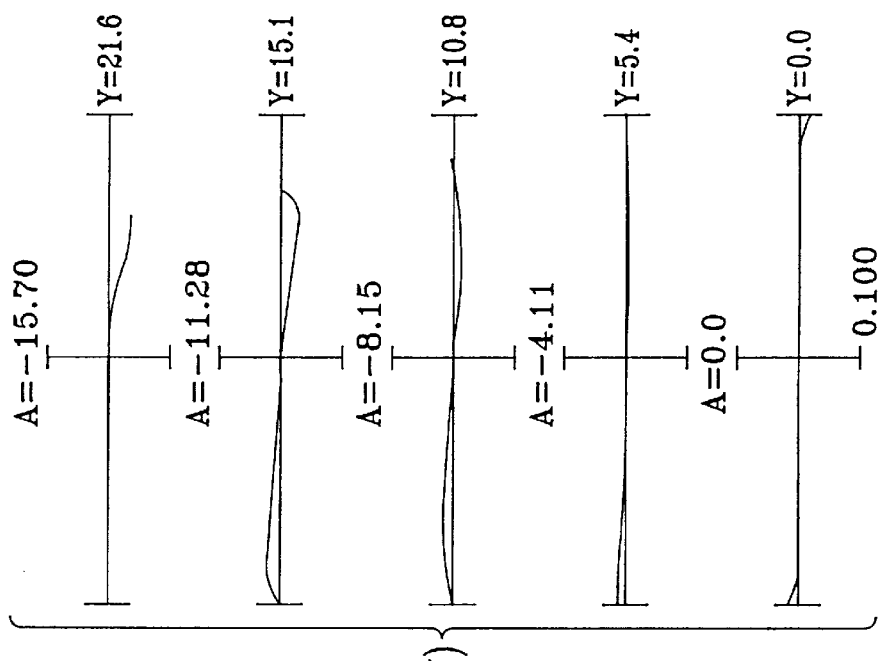
FIGS. 5B(I)–5B(IV) are plots of spherical aberration, astigmatism, distortion, and coma, respectively, for Working Example 2, at a first intermediate focal length, focusing on an object at infinity.
Figure 5B:
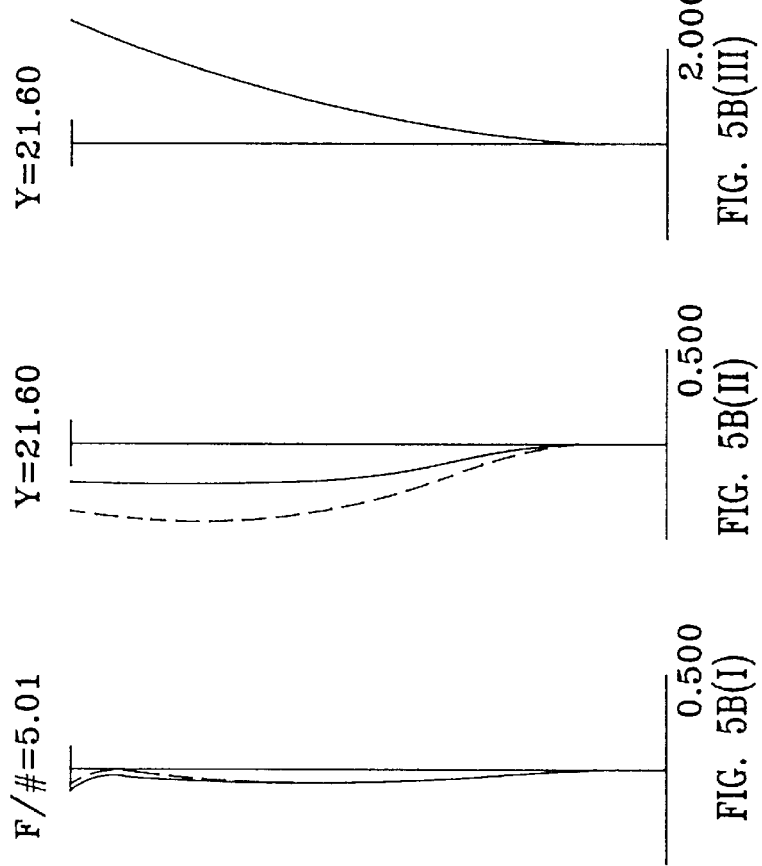
Figure 5E:
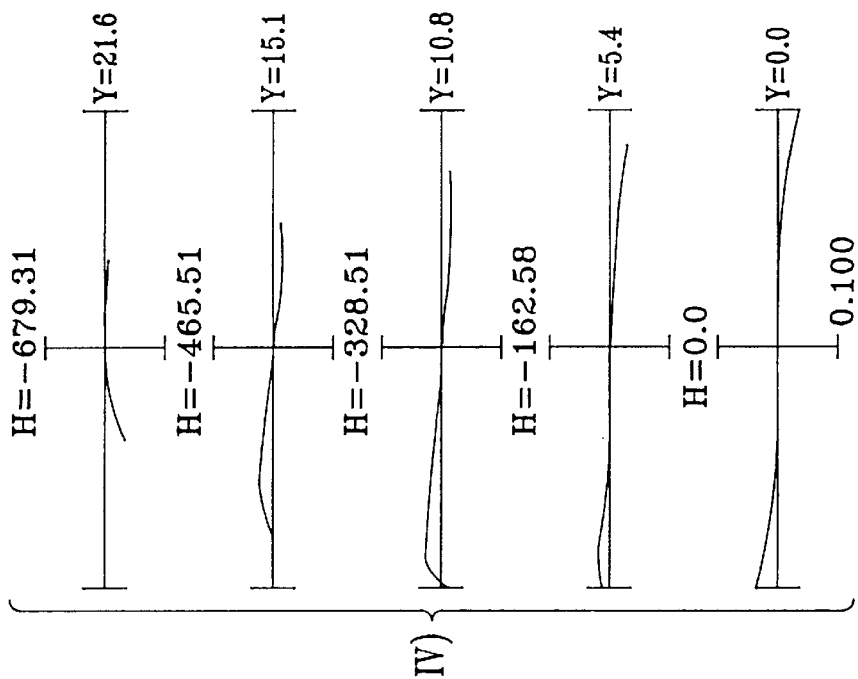
FIGS. 5E(I)–5E(IV) are plots of spherical aberration, astigmatism, distortion, and coma, respectively, for Working Example 2, wide angle mode, focusing on a finite-distant object, photomagnification ratio=1/30.
Figure 5E:
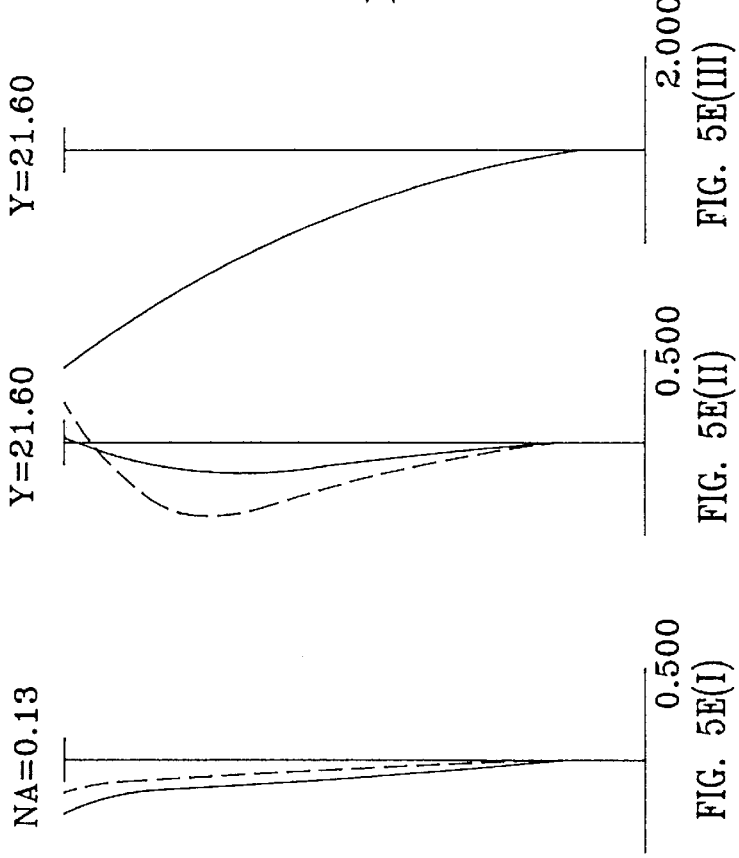
Figure 5G:
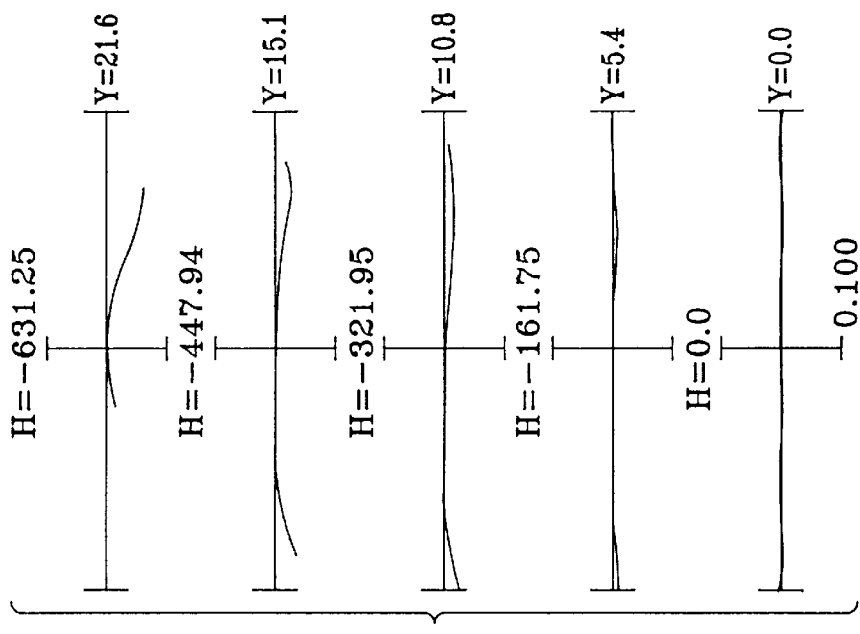
FIGS. 5G(I)–5G(IV) are plots of spherical aberration, astigmatism, distortion, and coma, respectively, for Working Example 2, at a second intermediate focal length, focusing on a finite-distant object, photomagnification ratio=1/30.
Figure 5G:
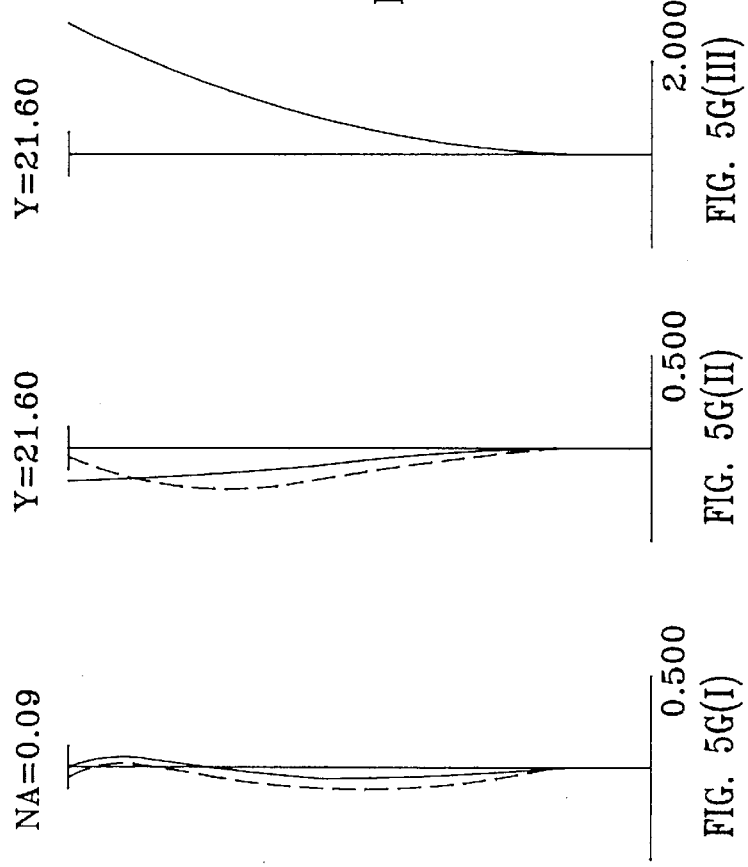
Figure 5H:
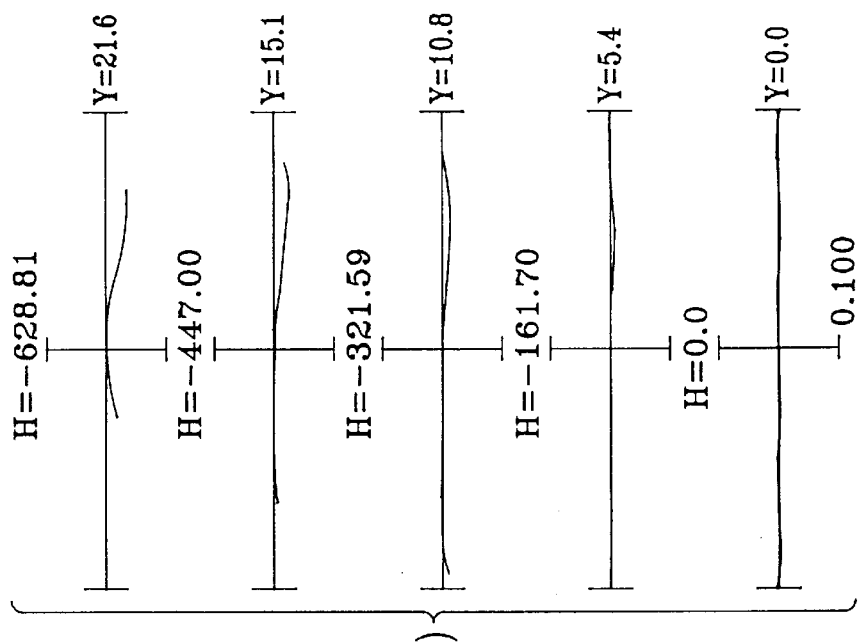
FIGS. 5H(I)–5H(IV) are plots of spherical aberration, astigmatism, distortion, and coma, respectively, for Working Example 2, maximum telephoto state, focusing on a finite-distant object, photomagnification ratio=1/30.
Figure 5H:
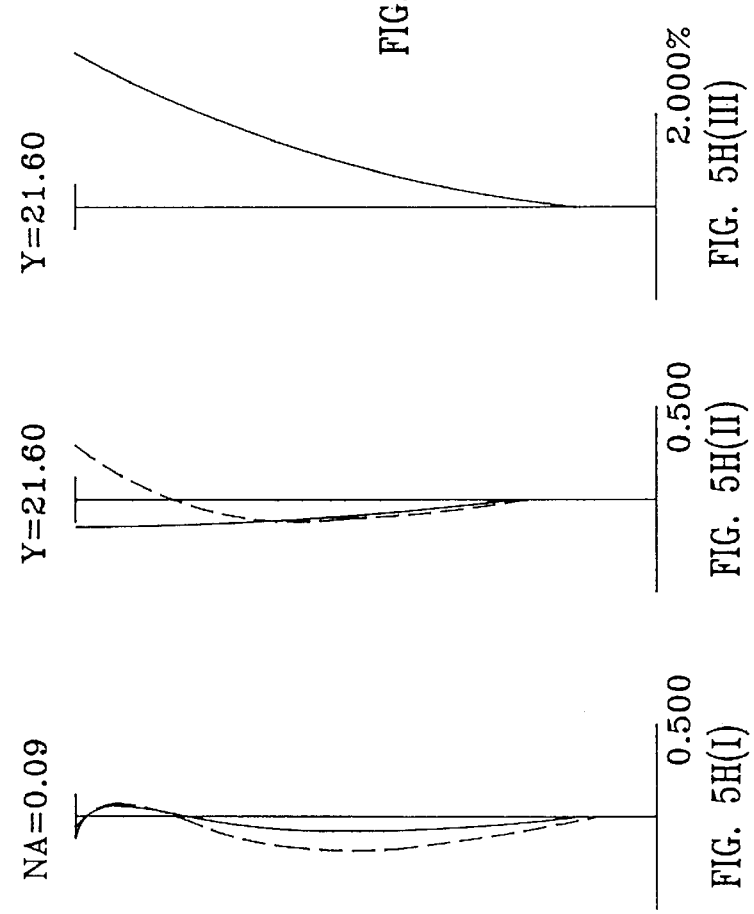

Zoom lens 40 of FIG. 4 represents Working Example 2 and comprises, from object 12 to image 14, first lens group G1 comprising a positive compound lens L11 consisting of a negative meniscus-shaped lens element L11a having an objectwise convex surface and a positive meniscus-shaped lens element L11b having an objectwise convex surface, and a positive meniscus-shaped lens element L12 having an objectwise convex surface; second lens group G2 comprising a negative meniscus-shaped lens element L21 having an objectwise convex surface, a biconcave lens element L22, and a biconvex lens element L23; third lens group G3 comprising a negative compound lens L3 consisting of a biconcave lens element L3a and a positive meniscus-shaped lens element L3b having an objectwise convex surface; fourth lens group G4 comprising a biconvex lens element L41, a positive meniscus-shaped lens element L42 having an objectwise convex surface, and a negative meniscus-shaped lens element L43 having an objectwise concave surface; and fifth lens group G5 comprising a biconvex lens element L51, a positive compound lens L52 consisting of a biconvex lens element L52a and a biconcave lens element L52b, a biconvex lens element L53, and a negative meniscus-shaped lens element L54 having an objectwise concave surface.

In addition, aperture stop AS is disposed between third lens group G3 and fourth lens group G4 and moves with fourth lens group G4 during zooming. Also, focusing is achieved by axially moving third lens group G3.

The following Table 2 lists the specification values of Working Example 2 of the present invention

TABLE 2 f = 36.00–75.00–112.50–171.25
F/# = 3.90–5.02–5.50–5.87
2ω = 63.83° – 31.40° – 21.12° – 13.92°

TABLE 2-continued

| S | R | d | n | ν |
|---|---|---|---|---|
| 1 | 121.0353 | 1.875 | 1.84666 | 23.83 |
| 2 | 53.6309 | 7.5 | 1.6516 | 58.44 |
| 3 | 903.2446 | 0.125 | | |
| 4 | 51.9503 | 5 | 1.7481 | 52.3 |
| 5 | 192.6792 | (d5 is variable) | | |
| 6 | 126.1037 | 1.875 | 1.7725 | 49.61 |
| 7 | 18.323 | 5.25 | | |
| 8 | -89.6368 | 1.375 | 1.835 | 42.98 |
| 9 | 78.6459 | 0.125 | | |
| 10 | 29.841 | 3.938 | 1.76182 | 26.55 |
| 11 | -172.2154 | (d11 is variable) | | |
| 12 | -37.1905 | 1.25 | 1.835 | 42.98 |
| 13 | 31.6473 | 2.75 | 1.84666 | 23.83 |
| 14 | 240.1302 | (d14 variable) | | |
| 15 | ∞ | 0.875 | | (Aperture stop AS) |
| 16 | 26.9305 | 4.25 | 1.48749 | 70.44 |
| 17 | -40.4244 | 0.125 | | |
| 18 | 39.9492 | 2.25 | 1.48749 | 70.44 |
| 19 | 253.3137 | 1.375 | | |
| 20 | -30.0234 | 1.5 | 1.8061 | 33.27 |
| 21 | -483.6197 | (d21 is variable) | | |
| 22 | 26.5109 | 5.625 | 1.5168 | 64.2 |
| 23 | -53.4455 | 1.25 | | |
| 24 | 39.5636 | 3.75 | 1.48749 | 70.44 |
| 25 | 136.4961 | 1.875 | 1.835 | 42.98 |
| 26 | 22.6633 | 12.5 | | |
| 27 | 55.9783 | 2.875 | 1.75692 | 31.62 |
| 28 | -89.4049 | 3.5 | | |
| 29 | -15.436 | 1.5 | 1.7725 | 49.61 |
| 30 | -25.3558 | BFL | | |

Variable spacing when zooming

| | | | | |
|---|---|---|---|---|
| f | 35.9999 | 74.9988 | 112.4982 | 171.2475 |
| d5 = D1 | 2.5000 | 16.5419 | 24.5701 | 31.2236 |
| d11 = D2 | 2.8282 | 3.7500 | 5.6280 | 7.5000 |
| d14 = D3 | 24.6167 | 14.8946 | 10.1755 | 4.3750 |
| d21 = D4 | 9.3022 | 5.8449 | 4.5679 | 3.9252 |
| BFL | 34.7531 | 50.5947 | 56.7812 | 61.6628 |

Focusing movement $\delta_3$ of third lens group G3
(focusing on a finite-distant object, photomagnification ratio = 1/30)

| | | | | |
|---|---|---|---|---|
| f | 35.9999 | 74.9988 | 112.4982 | 171.2475 |
| d0 | 1032.8374 | 2148.9448 | 3208.8149 | 4856.2273 |
| $\delta_3$ | 0.8007 | 0.7648 | 0.8867 | 1.1324 |

Corresponding values and design conditions:
$f_1 = 70.0887$
$f_2 = -43.9712$
$f_3 = -38.7995$
(1) $(f_2-f_3)/(f_2 \cdot f_3)^{1/2} = -0.066$
(2) $f_1/(f_W \cdot f_T)^{1/2} = 0.893$
(3) $(d11_T-d11_W)(f_W \cdot f_T)^{1/2}/(f_2 \cdot f_3) = 0.215$
(4) $[f_1 + f_2 - (d5_T-d5_W)/2]/(f_W \cdot f_T)^{1/2} = 0.150$ As is clear from the aberration plots of FIGS. 5A–5H, the configuration of this Working Example is well-corrected for aberrations over the zooming range (i.e., from maximum wide-angle state to the maximum telephoto state) and is suitable for achieving the objectives of the present invention.

While the present invention has been described in connection with preferred embodiments, it will be understood that it is not limited to those embodiments. On the contrary, it is intended to cover all alternatives, modifications and equivalents as may be included within the spirit and scope of the invention as defined in the appended claims.

What is claimed is:

1. A zoom lens capable of forming an image of an object and zooming between a maximum wide-angle state and a maximum telephoto state, the zoom lens comprising objectwise to imagewise:

a) a first axially movable lens group having positive refractive power and a focal length $f_1$;

b) a second axially movable lens group having negative refractive power and a focal length $f_2$;

c) a third axially movable lens group having negative refractive power and a focal length $f_3$;

d) a fourth axially movable lens group having positive refractive power;

e) a fifth axially movable lens group having positive refractive power;

f) a variable axial separation D1 between said first and second lens groups, including a maximum wide-angle state axial separation $D1_W$ and a maximum telephoto state axial separation $D1_T$, and wherein said axial separation D1 increases when zooming from the wide angle mode to the maximum telephoto state;

g) a variable axial separation D2 between said second and third lens groups, including a maximum wide-angle state axial separation $D2_W$ and a maximum telephoto state axial separation $D2_T$, and wherein said variable axial separation D2 increases when zooming from the maximum wide-angle state to the maximum telephoto state;

h) an axial separation D3 between said third and fourth lens groups which decreases when zooming from the wide angle mode to the maximum telephoto state;

i) an axial separation D4 between said fourth and fifth lens groups which changes when zooming from the wide angle mode to the maximum telephoto state; and j) wherein the zoom lens has a focal length in the maximum wide-angle state of $f_W$ and a focal length in the maximum telephoto state of $f_T$ and satisfies the conditions:

$$-0.5 < (f_2 - f_3)/(f_2 \cdot f_3)^{1/2} < 0.3; \qquad (1)$$

$$0.8 < f_1/(f_W \cdot f_T)^{1/2} < 1.4. \qquad (2)$$

2. A zoom lens according to claim 1, capable of focusing on a close-range object by axially moving one lens group between said first lens group and said fourth lens group.

3. A zoom lens according to claim 1, satisfying the condition $$0.07 < (D2_T - D2_W)(f_W \cdot f_T)^{1/2}/(f_2 \cdot f_3) < 0.35.$$

4. A zoom lens according to claim 3, further including an aperture stop disposed imagewise of said third lens group and objectwise of said fifth lens group.

5. A zoom lens according to claim 3, satisfying the condition $$-0.5 < [f_1 + f_2 - (D1_T - D1_W)/2]/(f_W \cdot f_T)^{1/2} < 0.75.$$

6. A zoom lens according to claim 3, wherein said second lens group comprises two positive lens elements and one negative lens element.

7. A zoom lens capable of forming an image of an object, the zoom lens comprising objectwise to imagewise:

a) a first lens group having positive refractive power;

b) a second lens group having negative refractive power;

c) a third lens group having negative refractive power;

d) a fourth lens group having positive refractive power;

e) a first variable axial separation between said first and second lens groups;

f) a second variable axial separation between said second and third lens groups;

g) a third variable axial separation between said third and said fourth lens groups;

h) wherein when at least said first lens group moves toward the object when zooming the zoom lens from a maximum wide-angle state to a maximum telephoto state, said first variable axial separation increases, said second variable axial separation increases and said third variable axial separation decreases; and i) wherein said third lens group is capable of moving axially for focusing on a close-range object.

8. A zoom lens according to claim 7, wherein a fifth lens group is arranged imagewise of said fourth lens group and moves toward the object when zooming the zoom lens from said maximum wide-angle state to the maximum telephoto state.

9. A zoom lens according to claim 8, wherein an aperture stop is disposed adjacent said third lens group.

10. A zoom lens according to claim 9, satisfying the conditions $$-0.5 < (f_2 - f_3)/(f_2 \cdot f_3)^{1/2} < 0.3; \qquad (1)$$

$$0.8 < f_1/(f_W \cdot f_T)^{1/2} < 1.4; \text{ and} \qquad (2)$$

wherein said second lens group has a focal length $f_2$, said third lens group has a focal length $f_3$, and the zoom lens has a maximum wide-angle state focal length $f_W$ and a maximum telephoto state focal length $f_T$.

11. A zoom lens having an axis and capable of forming an image of an object, the zoom lens comprising objectwise to imagewise:

a) a first lens group having positive refractive power;

b) a second lens group having negative refractive power;

c) a third lens group having negative refractive power;

d) a fourth lens group having positive refractive power;

e) a fifth lens group having positive refractive power;

f) a first variable axial separation between said first and second lens groups;

g) a second variable axial separation between said second and third lens groups;

h) a third variable axial separation between said third and said fourth lens groups;

i) a fourth variable axial separation between said fourth and fifth lens groups;

j) wherein when at least said first lens group moves toward the object when zooming the zoom lens from a maximum wide-angle state to a maximum telephoto state, said first variable axial separation increases, said second variable axial separation increases, said third variable axial separation decreases, and said fourth variable axial separation changes; and k) wherein at least one of said lens groups is a shift lens group capable of movement perpendicular to the axis to cause a shift in the image to compensate for image blurring.

12. A zoom lens according to claim 11, wherein said at least one shift lens group moves perpendicular to the axis to cause said shift in the image to compensate for image blurring caused by movement of the zoom lens.

* * * * *

UNITED STATES PATENT AND TRADEMARK OFFICE
CERTIFICATE OF CORRECTION

PATENT NO. : 6,002,527
DATED : December 14, 1999
INVENTOR(S) : Motoyuki OHTAKE

It is certified that error appears in the above-identified patent and that said Letters Patent is hereby corrected as shown below:

In claim 10, column 14, line 25, delete "1,4" and insert - -1.4- - therefor.

Signed and Sealed this

Twenty-sixth Day of September, 2000

Attest:

Q. TODD DICKINSON

*Attesting Officer*          *Director of Patents and Trademarks*